US012536377B2

(12) United States Patent
Veyseh et al.

(10) Patent No.: US 12,536,377 B2
(45) Date of Patent: Jan. 27, 2026

(54) EXTRACTING DEFINITIONS FROM DOCUMENTS UTILIZING DEFINITION-LABELING-DEPENDENT MACHINE LEARNING BACKGROUND

(71) Applicant: Adobe Inc., San Jose, CA (US)

(72) Inventors: Amir Pouran Ben Veyseh, Eugene, OR (US); Franck Dernoncourt, Sunnyvale, CA (US); Quan Tran, San Jose, CA (US); Yiming Yang, Santa Clara, CA (US); Lidan Wang, San Jose, CA (US); Rajiv Jain, Vienna, VA (US); Vlad Morariu, Potomac, MD (US); Walter Chang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 667 days.

(21) Appl. No.: 16/990,357

(22) Filed: Aug. 11, 2020

(65) Prior Publication Data

US 2022/0050967 A1 Feb. 17, 2022

(51) Int. Cl.
*G06F 40/30* (2020.01)
*G06F 40/205* (2020.01)
(Continued)

(52) U.S. Cl.
CPC ............ *G06F 40/30* (2020.01); *G06F 40/205* (2020.01); *G06F 40/216* (2020.01);
(Continued)

(58) Field of Classification Search
CPC ...... G06F 40/30; G06F 40/205; G06F 40/253; G06F 40/279; G06F 40/242;
(Continued)

(56) References Cited

U.S. PATENT DOCUMENTS

| 11,625,535 | B1 * | 4/2023 | Hore | ........................ | G06F 40/30 |
| | | | | | 704/9 |
| 2007/0282780 | A1 * | 12/2007 | Regier | .................. | G06F 16/951 |
| | | | | | 707/E17.108 |

(Continued)

OTHER PUBLICATIONS

Xiaobo Shu, Bowen Yu, Zhenyu Zhang, Tingwen Liu; DRG2vec: Learning Word Representations from Definition Relational Graph; Jul. 24, 2020 URL: https://ieeexplore.ieee.org/abstract/document/9207015 (Year: 2020).*

(Continued)

*Primary Examiner* — Richa Sonifrank
(74) *Attorney, Agent, or Firm* — Keller Preece PLLC

(57) ABSTRACT

This disclosure describes methods, non-transitory computer readable storage media, and systems that extract a definition for a term from a source document by utilizing a single machine-learning framework to classify a word sequence from the source document as including a term definition and to label words from the word sequence. To illustrate, the disclosed system can receive a source document including a word sequence arranged in one or more sentences. The disclosed systems can utilize a machine-learning model to classify the word sequence as comprising a definition for a term and generate labels for the words from the word sequence corresponding to the term and the definition. Based on classifying the word sequence and the generated labels, the disclosed system can extract the definition for the term from the source document.

20 Claims, 9 Drawing Sheets

(51) Int. Cl.

| | |
|---|---|
| *G06F 40/216* | (2020.01) |
| *G06F 40/242* | (2020.01) |
| *G06F 40/253* | (2020.01) |
| *G06F 40/268* | (2020.01) |
| *G06F 40/279* | (2020.01) |
| *G06F 40/284* | (2020.01) |
| *G06F 40/289* | (2020.01) |
| *G06N 3/044* | (2023.01) |
| *G06N 3/0442* | (2023.01) |
| *G06N 3/045* | (2023.01) |
| *G06N 3/0464* | (2023.01) |
| *G06N 3/08* | (2023.01) |
| *G06N 3/09* | (2023.01) |
| *G06N 7/01* | (2023.01) |

(52) U.S. Cl.
CPC .......... *G06F 40/242* (2020.01); *G06F 40/253* (2020.01); *G06F 40/268* (2020.01); *G06F 40/279* (2020.01); *G06F 40/284* (2020.01); *G06F 40/289* (2020.01); *G06N 3/044* (2023.01); *G06N 3/0442* (2023.01); *G06N 3/045* (2023.01); *G06N 3/0464* (2023.01); *G06N 3/09* (2023.01); *G06N 3/08* (2013.01); *G06N 7/01* (2023.01)

(58) Field of Classification Search
CPC .... G06F 40/268; G06F 40/284; G06F 40/289; G06F 40/216; G06N 3/08; G06N 3/0445; G06N 3/0454; G06N 7/005
See application file for complete search history.

(56) References Cited

U.S. PATENT DOCUMENTS

| | | | |
|---|---|---|---|
| 2016/0078772 A1* | 3/2016 | Bhat | G09B 7/00 434/322 |
| 2016/0103823 A1* | 4/2016 | Jackson, Jr. | G06N 5/025 704/9 |
| 2017/0161261 A1* | 6/2017 | Mungi | G06F 40/30 |
| 2017/0358295 A1* | 12/2017 | Roux | G06F 40/56 |
| 2018/0121799 A1* | 5/2018 | Hashimoto | G06N 3/08 |
| 2018/0157743 A1* | 6/2018 | Hori | G06F 16/35 |
| 2018/0196881 A1* | 7/2018 | Lundin | G06F 40/205 |
| 2018/0336183 A1* | 11/2018 | Lee | G06N 5/022 |
| 2019/0325293 A1* | 10/2019 | Wang | G06K 9/6256 |
| 2020/0004823 A1* | 1/2020 | Chatterjee | G06F 40/289 |
| 2020/0089758 A1* | 3/2020 | Reddi | G06F 16/93 |
| 2020/0134442 A1* | 4/2020 | Sim | G06Q 10/06311 |
| 2020/0142957 A1* | 5/2020 | Patra | G06N 3/04 |
| 2020/0184307 A1* | 6/2020 | Lipka | G06N 3/0472 |
| 2020/0184339 A1* | 6/2020 | Li | G06N 3/044 |
| 2020/0342168 A1* | 10/2020 | He | G06F 40/242 |
| 2020/0356851 A1* | 11/2020 | Li | G06F 16/353 |
| 2020/0380274 A1* | 12/2020 | Deshmukh | G06F 40/284 |
| 2021/0004438 A1* | 1/2021 | Iter | G06F 16/36 |
| 2021/0089588 A1* | 3/2021 | Le | G06N 3/04 |
| 2021/0303783 A1* | 9/2021 | Misra | G06F 40/44 |
| 2021/0303793 A1* | 9/2021 | Wang | G06F 40/166 |
| 2022/0036003 A1* | 2/2022 | Bali | G06N 3/08 |

OTHER PUBLICATIONS

Yunlai Xu, Xiangying Ran, Wei Sun, Xiangyang Luo, Chongjun Wang; Gated Neural Network with Regularized Loss for Multi-label Text Classification; Jul. 19, 2019 URL: https://ieeexplore.ieee.org/document/8851686 (Year: 2019).*

Amir Pouran Ben Veyseh, Franck Dernoncourt, Dejing Dou,Thien Huu Nguyen; A Joint Model for Definition Extraction with Syntactic Connection and Semantic Consistency; Nov. 5, 2019 URL:https://arxiv.org/abs/1911.01678v1 (Year: 2019).*

Abhishek Laddha, Arjun Mukherjee; Aspect Specific Opinion Expression Extraction using Attention based LSTM-CRF Network; URL: https://arxiv.org/pdf/1902.02709.pdf (Year: 2019).*

Ando, R., and Zhang, T. 2005. A high-performance semi-supervised learning method for text chunking. In ACL.

Anke, L. E., and Schockaert, S. 2018. Syntactically aware neural architectures for definition extraction. In NAACL-HLT.

Boella, G.; Di Caro, L.; Ruggeri, A.; and Robaldo, L. 2014. Learning from syntax generalizations for automatic semantic annotation. Journal of Intelligent Information Systems 43(2):231-246.

Chiu, J. P., and Nichols, E. 2016. Named entity recognition with bidirectional LSTM-CNNs. In TACL.

Clark, K.; Luong, M.-T.; Manning, C. D.; and Le, Q. V. 2018. Semi-supervised sequence modeling with cross-view training. In EMNLP.

Cui, H.; Kan, M.-Y.; and Chua, T.-S. 2004. Unsupervised learning of soft patterns for generating definitions from online news. In WWW.

Cui, H.; Kan, M.-Y.; and Chua, T.-S. 2005. Generic soft pattern models for definitional question answering. In SIGIR. ACM.

Devlin, J.; Chang, M.-W.; Lee, K.; and Toutanova, K. 2019. BERT: Pre-training of deep bidirectional transformers for language understanding. In Proceedings of the 2019 Conference of the North American Chapter of the Association for Computational Linguistics: Human Language Technologies, vol. 1 (Long and Short Papers), 4171-4186. Minneapolis, Minnesota: Association for Computational Linguistics.

Espinosa-Anke, L.; Carlini, R.; Saggion, H.; and Ronzano, F. 2016. Defext: a semi supervised definition extraction tool. arXiv preprint arXiv:1606.02514.

Fahmi, I., and Bouma, G. 2006. Learning to identify definitions using syntactic features. In Proceedings of the Workshop on Learning Structured Information in Natural Language Applications.

Florian, R.; Ittycheriah, A.; Jing, H.; and Zhang, T. 2003. Named entity recognition through classifier combination. In CoNLL-2003.

Jin, Y.; Kan, M.-Y.; Ng, J.-P.; and He, X. 2013. Mining scientific terms and their definitions: A study of the acl anthology. In EMNLP.

Kipf, T. N., and Welling, M. 2017. Semi-supervised classification with graph convolutional networks. In ICLR.

Klavans, J. L., and Muresan, S. 2001. Evaluation of the definder system for fully automatic glossary construction. In Proceedings of the AMIA Symposium, 324. American Medical Informatics Association.

Lafferty, J.; McCallum, A.; and Pereira, F. 2001. Conditional random fields: Probabilistic models for segmenting and labeling sequence data. In ICML.

Li, S.; Xu, B.; and Chung, T. L. 2016. Definition extraction with lstm recurrent neural networks. In Chinese Computational Linguistics and Natural Language Processing Based on Naturally Annotated Big Data.

Liu, Y.; Meng, F.; Zhang, J.; Xu, J.; Chen, Y.; and Zhou, J. 2019. GCDT: A global context enhanced deep transition architecture for sequence labeling. In ACL.

Miwa, M., and Bansal, M. 2016. End-to-end relation extraction using LSTMs on sequences and tree structures. In ACL.

Navigli, R., and Velardi, P. 2010a. Learning word-class lattices for definition and hypernym extraction. In ACL.

Nguyen, T. H., and Grishman, R. 2015a. Relation extraction: Perspective from convolutional neural networks. In Proceedings of the 1st NAACL Workshop on Vector Space Modeling for NLP (VSM).

Nguyen, T. H., and Grishman, R. 2016d. Combining neural networks and log-linear models to improve relation extraction. In Proceedings of IJCAI Workshop on Deep Learning for Artificial Intelligence (DLAI).

Nguyen, T. H.; Sil, A.; Dinu, G.; and Florian, R. 2016b. Toward mention detection robustness with recurrent neural networks. In Proceedings of IJCAI Workshop on Deep Learning for Artificial Intelligence (DLAI).

Nguyen, T. H.; Plank, B.; and Grishman, R. 2015c. Semantic representations for domain adaptation: A case study on the tree kernel-based method for relation extraction. In ACL-IJCNLP.

(56) References Cited

OTHER PUBLICATIONS

Pennington, J.; Socher, R.; and Manning, C. D. 2014. Glove: Global vectors for word representation. In Empirical Methods in Natural Language Processing (EMNLP).

Ratinov, L., and Roth, D. 2009. Design challenges and misconceptions in named entity recognition. In CoNLL.

Spala, S.; Miller, N. A.; Yang, Y.; Dernoncourt, F.; and Dockhorn, C. 2019. Deft: A corpus for definition extraction in free-and semi-structured text. In Proceedings of the 13th Linguistic Annotation Workshop, 124-131.

Westerhout, E. Definition extraction using linguistic and structural features. In Proceedings of the 1st Workshop on Definition Extraction, 61-67 (Association for Computational Linguistics, 2009).

Xu, K.; Li, C.; Tian, Y.; Sonobe, T.; Kawarabayashi, K.-i.; and Jegelka, S. 2018. Representation learning on graphs with jumping knowledge networks. In ICML.

Zeng, D.; Liu, K.; Lai, S.; Zhou, G.; and Zhao, J. 2014. Relation classification via convolutional deep neural network. In COLING.

Zhou, G.; Su, J.; Zhang, J.; and Zhang, M. 2005. Exploring various knowledge in relation extraction. In ACL.

\* cited by examiner

EXTRACTING DEFINITIONS FROM DOCUMENTS UTILIZING DEFINITION-LABELING-DEPENDENT MACHINE LEARNING BACKGROUND

BACKGROUND

Based on recent improvements to computer processing and modeling, some computing systems can automatically extract definitions from digital documents—albeit with varying accuracy and limited application to various texts. Manually creating resources from text, particularly from large corpuses, is a difficult and time-consuming task that requires domain-specific and linguistic knowledge. To avoid such a time-consuming and difficult task, computer engineers and others have designed different approaches for machine-learning systems and other computing systems to identify definitions from texts or other digital content. By automatically extracting definitions from digital content, the computing systems can potentially create useful resources, such as dictionaries and glossaries for general or domain specific use cases. While new computing models have introduced more efficient definition extraction over manual definition extraction, existing informational-extraction systems can extract definitions with only limited accuracy and apply models to only a limited or inflexible set of text types or domains.

SUMMARY

This disclosure describes one or more embodiments of methods, non-transitory computer readable media, and systems that solve the foregoing problems in addition to providing other benefits. In particular, the disclosed systems can extract a definition for a term from a source document by utilizing a single machine-learning framework to classify a word sequence from the source document as including a term definition and to label words from the word sequence. For instance, the disclosed systems can receive a source document including a word sequence arranged in one or more sentences. The disclosed systems can then utilize a machine-learning model to classify the word sequence as comprising a definition for a term and generate labels for the words from the word sequence corresponding to the term and the definition. Based on classifying the word sequence and the generated labels, the disclosed systems can extract the definition for the term from the source document. By jointly classifying the word sequence and generating word labels utilizing a single machine-learning model that recognizes interdependencies between sequence classification and sequence labeling, the disclosed systems can accurately and flexibly extract a definition for a term across one or more complex sentences.

BRIEF DESCRIPTION OF THE DRAWINGS

The detailed description refers to the drawings briefly described below.

DETAILED DESCRIPTION

Figure 1:
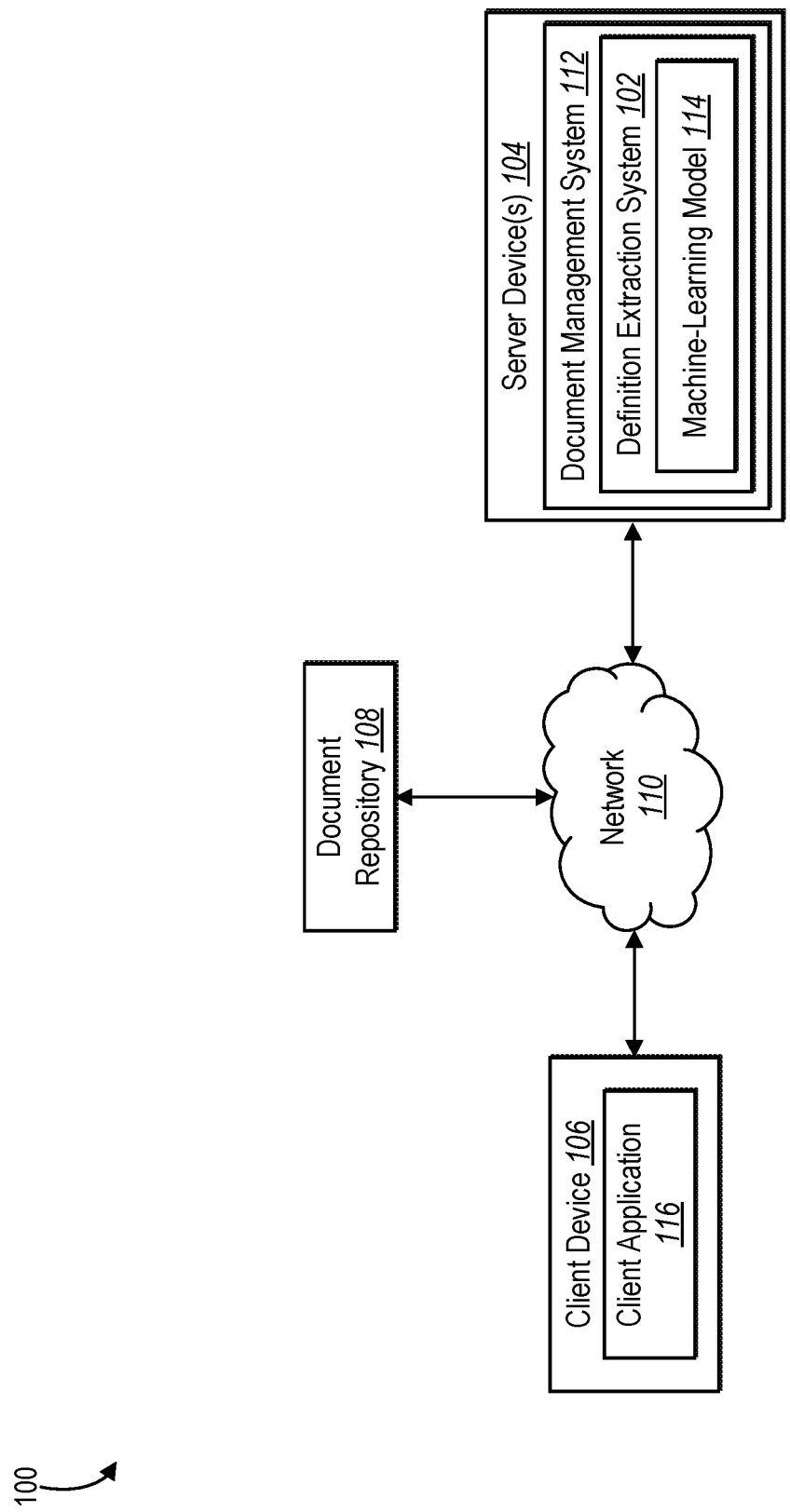
FIG. 1 illustrates a block diagram of a system environment in which a definition extraction system can operate in accordance with one or more implementations.

This disclosure describes one or more embodiments of a definition extraction system that can utilize a single machine-learning framework to classify a word sequence from a source document as including a term definition, label words from the word sequence, and extract the term definition from text in the source document based on both the classification and labels. In some cases, the definition extraction system uses a machine-learning model that exploits both (i) global structures of sentences from the source document and (ii) semantic consistencies between terms and corresponding definitions to improve the feature representations used for extracting term definitions. To capture such improved feature representations, in some implementations, the definition extraction system uses a multi-task-machine-learning model—comprising a graph convolutional neural network—to generate vectors predicting dependency paths between terms and definitions as a basis for extracting term definitions.

For example, in some embodiments, the definition extraction system receives a source document that includes a word sequence arranged in one or more sentences. The definition extraction system further generates dependency-encoded-word vectors that indicate a dependency path between a term and a definition within the word sequence utilizing a global dependency tree from the word sequence. The definition extraction system then uses a machine-learning model (e.g., one or more neural networks) to determine a sequence classification for the word sequence indicating whether the word sequence is definitional based on the dependency-encoded-word vectors. The definition extraction system also uses the machine-learning model to generate word labels (e.g., term, definition, qualifier, or other label) for words in the word sequence based on the dependency-encoded-word vectors. By utilizing machine learning to jointly classify a word sequence and generate labels for words in the word sequence, the definition extraction system extracts a term-definition pair across the one or more sentences of the word sequence.

In one or more embodiments, the definition extraction system analyzes a source document to determine whether the source document includes a definition of a term included in the source document. For example, the definition extraction system can receive a source document including a plurality of words in a word sequence arranged in one or more sentences. In response to receiving the source document, the definition extraction system can determine a global dependency tree corresponding to the one or more sentences. For instance, the definition extraction system can determine a dependency tree for each sentence in the document (or a portion of the document). The definition extraction system can then generate a global dependency tree by linking the dependency trees together via a root node.

Based on the global dependency, in one or more embodiments, the definition extraction system generates dependency-encoded-word vectors for the words in the source document. In particular, the definition extraction system can first generate word representation vectors for words in the word sequence based on word embeddings and parts-of-speech embedding vectors associated with the words. For instance, the definition extraction system can utilize a set of encoding layers from the machine-learning model (e.g., a bi-directional long-short-term-memory network within the machine-learning model) to generate the word representation vectors from the word embeddings and parts-of-speech embedding vectors.

In some embodiments, the definition extraction system subsequently uses the word representation vectors to generate the dependency-encoded-word vectors according to the global dependency tree. For example, the definition extraction system can utilize another set of encoding layers from the machine-learning model (e.g., a graph convolution network within the machine-learning model) to generate structure-aware representations of words in the word sequence based on the word representation vectors and their respective neighbors within the global dependency tree. By linking dependency trees of a plurality of sentences within the global dependency tree, the definition extraction system can further determine structure-aware word representations based on their respective neighbors across the plurality of sentences. The definition extraction system can thus generate dependency-encoded-word vectors that take into account the overall structure of the word sequence.

As indicated above, in one or more embodiments, the definition extraction system can utilize dependency-encoded-word vectors to classify a word sequence based on whether the word sequence includes a definition for a term. For example, the definition extraction system can determine a representation for the word sequence by using max pooling over the dependency-encoded-word vectors. The definition extraction system can then feed the representation of the word sequence into a feed forward network and determine a sequence classification for the word sequence.

In addition to determining a sequence classification, in some cases, the definition extraction system jointly generates labels for words within the word sequence using the machine-learning model. In particular, the definition extraction system can assign labels indicating whether each word corresponds to a term, a definition, a qualifier associated with a definition, or other label type. For instance, the definition extraction system can determine a feature vector for a word by concatenating a corresponding word representation vector with a corresponding dependency-encoded-word vector to integrate information about the word with contextual information about the word. Additionally, the definition extraction system can predict a label for the word based on the feature vector. In some embodiments, the definition extraction system can use a conditional random field layer to predict the label from the feature vector.

After determining a sequence classification and labels for a word sequence, in some embodiments, the definition extraction system extracts a term definition from a source document. For example, in response to determining that the word sequence classifies as including a definition for a term, the definition extraction system can use the labels to map one or more words in a term to one or more words in a definition. Furthermore, the definition extraction system can extract information that indicates specific conditions under which the definition applies to the term based on any qualifiers identified (e.g., when the definition holds true for the term).

As suggested above, the definition extraction system can utilize a machine-learning model comprising different branches or subnetworks to classify a word sequence and label words within the word sequence. In one or more embodiments, the definition extraction system can jointly train the branches or subnetworks. For example, the definition extraction system can determine a dependency loss associated with generating dependency-encoded-word vectors. The definition extraction system can also determine a labeling loss associated with generating the word labels. Furthermore, the definition extraction system can determine a classification loss associated with classifying the word sequence. In some cases, the definition extraction system can determine a semantic consistency loss associated with semantic consistencies between the word sequence and the term-definition pair.

In some embodiments, the definition extraction system combines the various losses into a single loss function with specific weights to jointly train the machine-learning models. By determining a classification loss, labeling loss, dependency loss, and semantic consistency loss across training iterations, the definition extraction system can enforce consistency between representations of terms and definitions globally by increasing semantic consistency between the representations of the entire sentences and the terms or definitions.

As noted briefly above, existing informational-extraction systems lack accuracy and flexibility. For example, some existing informational-extraction systems utilize a rule-based approach that extract definitions based on a set of defined linguistic rules and templates for capturing specific patterns that imply term-definition relations. Although existing informational-extraction systems that use the rule-based approach can demonstrate high precision in extracting term definitions from a limited type of text, these conventional systems have demonstrated low recall and are not adaptable to new domains. For instance, an existing informational-extraction system that utilizes a rules-based approach for linguistic rules and patterns for documents using medical terminology have poor adaptability to documents using legal terminology due to different rules and language patterns used in each domain.

To overcome the low recall of rule-based approaches, some existing informational-extraction systems utilize machine-learning models that rely on sets of identified syntactic and semantic features to extract definitions from text. For example, some existing systems attempt to cover a broader range of term-definition patterns by training classifier machine-learning models on a set of defined linguistic features. These existing systems, however, have limited flexibility due to low adaptability to new domains that may not have the same linguistic features. Utilizing such classifier machine-learning models on different domains can thus result in inaccurate results due to the different linguistic features of the different domains.

Furthermore, some existing informational-extraction systems utilize deep learning to perform automatic definition extraction. Such existing deep learning systems utilize pre-trained word representations that include knowledge about words and their architecture to extract features from analyzed text. Although the existing deep learning systems provide some improvements over other existing systems, the existing deep learning systems also fail to accurately and flexibly extract definitions in many realistic use cases. Specifically, the existing systems assume simple structures of term-definition pairs in the analyzed text that result in poor performance when applied to more complex linguistic structures that frequently appear in real-world documents. Accordingly, existing systems that automatically extract definitions from digital text have disadvantages resulting from lack of accuracy and flexibility across varying text structures and domains.

The disclosed definition extraction system demonstrates a number of technical improvements over existing systems. For example, the definition extraction system can improve the accuracy with which systems extract definitions from digital documents. To illustrate, while some existing systems utilize rule-based approaches or pre-specified sets of syntactic or semantic features to extract definitions, the definition extraction system uses the global structure of documents and semantic consistencies between terms and definitions to accurately extract definitions from complex sentence structures. In particular, the disclosed definition extraction system accounts for global structure and reinforces semantic consistencies by utilizing a single machine-learning framework to classify a word sequence from a source document and to label words from the word sequence—as part of extracting a term definition. By utilizing machine learning to enforce the syntactic and semantic consistency of terms and definitions based on the representations of individual words and across representations of one or more sentences, the definition extraction system can more accurately identify definitions for terms according to the semantic context of documents than conventional systems.

Relatedly, in some embodiments, the definition extraction system further improves accuracy via joint training of a machine-learning model for extracting definitions. For instance, in some embodiments, the definition extraction system determines separate losses for a plurality of layers of a neural network in connection with one or more of sequence classification, sequence labeling, enforcing semantic consistency, or determining dependency path information for extracting definitions of terms. By determining a joint loss function that weights losses associated with the various operations in a definition extraction process, in some embodiments, the definition extraction system can jointly learn parameters of the neural network based on the impact of each operation on the definition extraction process.

In addition to improved accuracy, in some implementations, the definition extraction system increases the flexibility with which systems extract definitions across complex or multiple sentences and from various document types. In contrast to existing information-extraction systems that require a definition of a term to be within the same sentence as the term, the definition extraction system can extract definitions of terms across more than one sentence. By utilizing information about global dependencies between words across a plurality of sentences in conjunction with enforcing syntactic and semantic consistencies of terms and definitions, for instance, the definition extraction system can extract definitions of terms across sentences by identifying the relationships of words based on the global context of the documents. By extracting definitions of terms across a plurality of sentences, the definition extraction system can extract definitions from complex language structures. Additionally, by extracting definitions based on the global context of documents, the definition extraction system can also adapt to new domains due to incorporating information about words and their global context when performing sequence labeling and classification.

As illustrated by the foregoing discussion, the present disclosure describes various features and advantages of the definition extraction system. As used in this disclosure, for example, a document or a source document includes a digital content item comprising text. For instance, a document can include, but is not limited to, a contract, a newspaper article, a journal article, a manuscript, presentations, a thesis paper, or other content item. In some embodiments, a document contains unstructured text that does not have a predefined format.

Additionally, in one or more embodiments, a word sequence includes a plurality of ordered words. For example, a word sequence can include words in a document arranged in an order to convey a specific meaning. To illustrate, a word sequence can include one or more words arranged in one or more sentences. In one or more embodiments, a word includes a string of characters defining an element of speech or writing. Furthermore, a "sentence" is a string of one or more words separated from other words by punctuation in speech or writing.

Furthermore, a term includes a word or phrase that describes a thing or concept. For example, a term can include one word. In alternative embodiments, a term includes a plurality of words. Additionally, a definition includes a collection of words that defines a meaning of a term. For example, a definition may define a term, such as "atom," to mean a basic unit of a chemical element. Accordingly, a term-definition pair includes a term and its corresponding definition. Furthermore, a qualifier includes one or more conditions under which a definition applies to a term. For example, a qualifier can indicate when a definition holds true for a term. If the conditions are not met, the definition may not apply to the term.

A machine-learning model includes a computer representation that can be tuned (e.g., trained) based on inputs to approximate unknown functions. In particular, a machine-learning model can include one or more layers that utilize algorithms to learn from, and make predictions on, known data by analyzing the known data to learn to generate outputs that reflect patterns and attributes of the known data. A neural network is a type of machine-learning model that includes interconnected artificial neurons (organized in layers) that communicate and learn to approximate complex functions and generate outputs based on a plurality of inputs provided to the model. In addition, a neural network can comprise an algorithm (or set of algorithms) that implements deep learning techniques that utilize a set of algorithms to model high-level abstractions in data.

In some embodiments, a machine-learning model can include one or more neural networks including, but not limited to, a convolutional neural network (e.g., a graph convolution neural network), a recurrent neural network (e.g., a bi-directional long-short-term-memory network), a conditional random field model, or a feed forward network. A neural network can make high-level abstractions in data by generating data-driven predictions or decisions from the known input data.

Additionally, encoding layers include one or more components of a machine-learning model or neural network that generate one or more encoded representations of words or other components of a document. For example, encoding layers can include a bi-directional long-short-term-memory network and a graph convolution neural network to generate encoded representations of words in a document. In one or more embodiments, encoding layers can also include components for generating word embeddings and parts-of-speech tags for words in a document that the bi-directional long-short-term-memory network and the graph convolution neural network use to generate the various word representations. Alternatively, in certain embodiments, encoding layers may include a convolutional neural network instead of a long-short-term-memory network.

Furthermore, sequence classification layers include one or more components of a machine-learning model or neural network that generate a classification for a word sequence. For instance, sequence classification layers can include one or more neural network layers to generate a sequence classification of a word sequence as including a definition for a term or not including a definition for a term. In one or more embodiments, sequence classification layers include a max pooling layer and a feed forward network with a softmax layer at the output of the feed forward network. Alternatively, in certain embodiments, sequence classification layers may include one or more rectified linear units ("ReLUs") and sigmoid functions instead of a softmax layer.

Sequence labeling layers include one or more components of a machine-learning model or neural network that generate labels for words of a word sequence. In some cases, sequence labeling layers include one or more neural network layers to generate a label for each word in a word sequence indicating whether the word is a term, a definition, a qualifier, or another term. In one or more embodiments, sequence labeling layers include a concatenator, a scoring layer, and a conditional random field layer. Alternatively, in certain embodiments, sequence labeling layers may include locally shared features instead of a conditional random field layer.

In addition, a word representation vector includes a vector that is an abstracted representation of a word that a bi-directional long-short-term-memory network or other machine-learning-model layer generates. In one or more embodiments, a word representation vector can include a vector generated based on a word embedding (e.g., an abstract representation of the word) and a parts-of-speech tag for a word.

In one or more embodiments, a dependency-encoded-word vector includes a representation of a word generated by a graph convolution neural network or other machine-learning-model layer. For instance, a dependency-encoded-word vector can include a representation of a word that takes into consideration relationships or dependencies of the word in connection with neighboring words within a dependency tree.

Additionally, a dependency tree includes a structure that indicates relationships between nodes in the tree. Specifically, a dependency tree for a sentence can represent relationships between words within the sentence. Furthermore, a global dependency tree includes a model of nodes and branches that can represent relationships between words within a word sequence. For example, a global dependency tree can represent relationships between words within a plurality of sentences and across the plurality of sentences.

A label includes an identification of a word within one or more specific categories for a term definition. In one or more embodiments, a label can include an identification of a word as a term, a definition, a qualifier associated with a definition, or a word unassociated with a term, definition, or qualifier (e.g., "other"). For example, a label can include one of a plurality of possible labels corresponding to a beginning-inside-outside ("BIO") tag format. Alternatively, a label can include one of a plurality of possible labels corresponding to other labeling schema with additional labels, such as a format that tags beginning tokens, middle tokens, end tokens, and single-token entities (e.g., "BMEWO" or "BMEWO+"). Specifically, the definition extraction system can assign labels for each word in a word sequence to encode the boundaries of terms and/or definitions (if any) within the word sequence.

Additionally, a sequence representation vector includes a representation of a word sequence. For example, a sequence representation vector can include a representation of a word sequence based on representations of words within the word sequence. In one or more embodiments, the definition extraction system generates a sequence representation vector for a word sequence by aggregating context aware vector representations of words in the word sequence (e.g., dependency-encoded-word vectors).

Turning now to the figures, FIG. 1 illustrates a schematic diagram of a system environment 100 in which a definition extraction system 102 can operate. In particular, the system environment 100 includes server device(s) 104, a client device 106, and a document repository 108 in communication via a network 110. Moreover, as shown, the server device(s) 104 include a document management system 112, which includes the definition extraction system 102. Furthermore, the definition extraction system 102 can include a machine-learning model 114. Additionally, the client device 106 can include a client application 116.

As shown in FIG. 1, the server device(s) 104 can include or host the document management system 112. The document management system 112 can include, or be part of, one or more systems that implement the management of digital content items for storing, creating, modifying, or displaying digital content items for one or more users of the document management system. For example, the document management system 112 can provide tools for viewing, generating, editing, or otherwise interacting with digital content items. To illustrate, the document management system 112 can provide tools for generating or editing digital content items with text, images, or other media to the client device 106 via the client application 116. In some embodiments, the document management system 112 can provide a remote graphical user interface to the client device 106 for a user to interact with digital content items via the client application 116 on the client device 106.

Furthermore, the document management system 112 can extract data from digital content items, such as documents that include text. To illustrate, the document management system 112 can extract information from documents created or hosted via the document management system 112. Alternatively, the document management system 112 can extract information from the document repository 108. Specifically, the document management system 112 can communicate with the document repository 108 via the network 110 to obtain documents and then extract data from the documents.

In one or more embodiments, the document repository 108 includes a plurality of text documents related to one or more knowledge domains. For example, the document repository 108 can include a domain-specific repository that includes documents with text including information about a specific domain (e.g., a specific area of medical or legal practice). Alternatively, the document repository 108 can include a general repository that includes documents with text including information about any number of domains (e.g., a search engine or other general knowledge source).

As mentioned, the document management system 112 can include the definition extraction system 102 to extract definitions from documents that include text. Specifically, the definition extraction system 102 can utilize the machine-learning model 114 to determine relationships between words within a document and encode the relationships in word representations. The definition extraction system 102 can further utilize the machine-learning model 114 to classify the document by predicting whether the document includes a term definition based on the encoded relationships. Additionally, the definition extraction system 102 can utilize the machine-learning model 114 to generate labels for words in the document indicating whether the words belong to a term, a definition, a qualifier associated with the definition, or another word type based on the encoded relationships. In response to determining that a document includes a term definition (e.g., based on the document classification), the definition extraction system 102 can extract the term definition from the document according to term and/or definition boundaries determined based on the word labels.

Furthermore, the definition extraction system 102 can track extraction statistics and store extraction data associated with documents. For instance, the definition extraction system 102 can store data associated with classifying documents as definitional (e.g., as including a term definition) or not definitional (e.g., as not including a term definition). The definition extraction system 102 can also store metadata associated with documents indicating whether the documents include term definitions and/or what the extracted term definitions are.

In one or more embodiments, the definition extraction system 102 can also utilize extracted term definitions to further train the machine-learning model 114. For instance, the definition extraction system 102 can utilize data associated with extracted term definitions from a set of documents (e.g., a set of training documents) to learn parameters of one or more layers of the machine-learning model 114. To illustrate, the definition extraction system 102 can use encoded dependencies, sequence classifications of documents, and word labels to generate a plurality of loss functions that the definition extraction system 102 then combines into a joint loss function for jointly learning the parameters of a plurality of layers in the machine-learning model 114.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 7. Furthermore, although not shown in FIG. 1, the client device 106 can be operated by a user (e.g., a user included in, or associated with, the system environment 100) to perform a variety of functions. In particular, the client device 106 can perform functions, such as, but not limited to, accessing, viewing, and interacting with a variety of digital content (e.g., via the client application 116). The client device 106 can also perform functions for generating, capturing, or accessing data to provide to the document management system 112 via the network 110. In one or more embodiments, the definition extraction system 102 can analyze documents obtained from the client device 106 or associated with digital content items from the client device 106 to extract term definitions. The definition extraction system 102 can provide extracted term definitions to the client device 106 for assisting the user of the client device 106 for interacting with digital content items (e.g., in instructions for performing operations associated with interacting with digital content items). Although FIG. 1 illustrates the system environment 100 with a single client device 106, the system environment 100 can include a different number of client devices.

In one or more embodiments, the server device(s) 104 include a variety of computing devices, including those described below with reference to FIG. 7. For example, the server device(s) 104 can include one or more servers for storing and processing data associated with digital content items (e.g., documents including text). The server device(s) 104 can also include a plurality of computing devices in communication with each other, such as in a distributed storage environment. In some embodiments, the server device(s) 104 comprise a content server. The server device(s) 104 can also comprise an application server, a communication server, a web-hosting server, a social networking server, a digital content campaign server, or a digital communication management server.

Additionally, as shown in FIG. 1, the system environment 100 includes the network 110. The network 110 can enable communication between components of the system environment 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 7.

Although FIG. 1 illustrates the server device(s) 104, the client device 106, and the document repository 108 communicating via the network 110, the various components of the system environment 100 can communicate and/or interact via other methods (e.g., the server device(s) 104 and the client device 106 can communicate directly or the server device(s) 104 may include the document repository 108). Furthermore, although FIG. 1 illustrates the definition extraction system 102 being implemented by a particular component and/or device within the system environment 100, the definition extraction system 102 can be implemented, in whole or in part, by other computing devices and/or components in the system environment 100 (e.g., the client device 106).

Figure 2A:
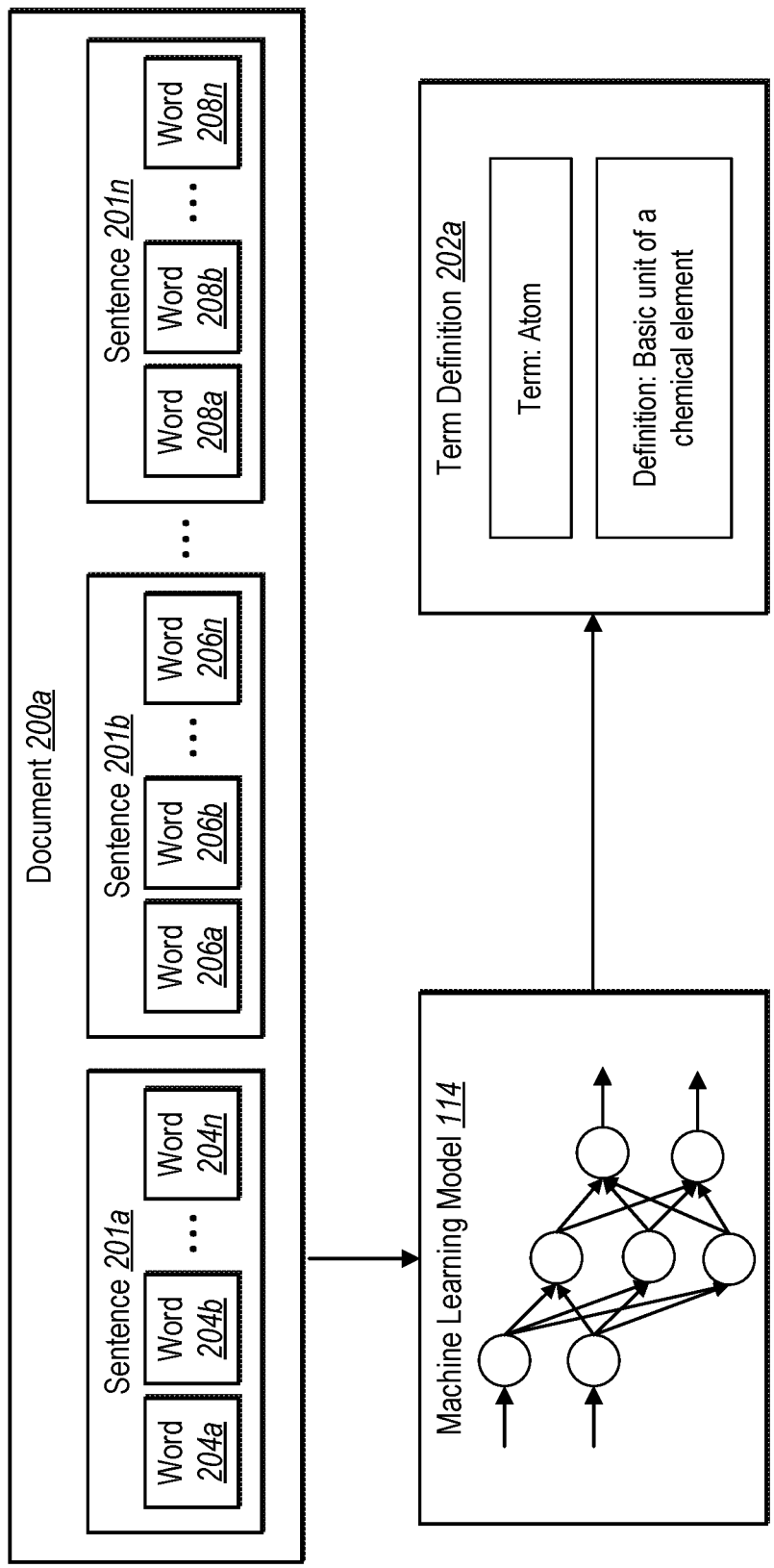
FIGS. 2A-2B illustrate diagrams of a definition extraction system using a machine-learning model to extract a term definition from a document in accordance with one or more implementations.
Figure 2B:
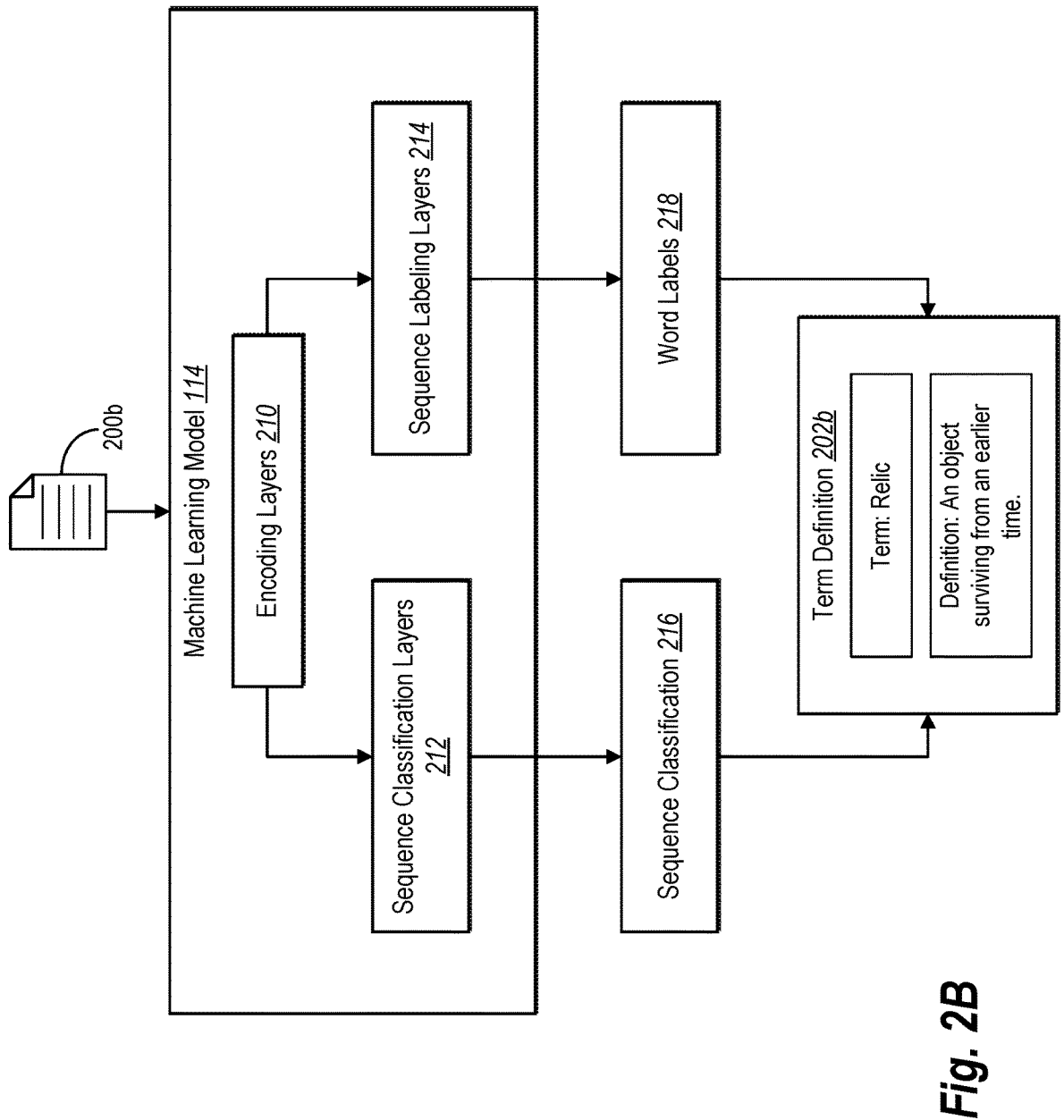

As mentioned above, the definition extraction system 102 can accurately and flexibly extract term definitions from documents utilizing machine learning. FIGS. 2A-2B illustrate examples of the machine-learning model 114 of the definition extraction system 102 analyzing a document 200a to extract a term definition 202a. In particular, FIGS. 2A-2B illustrate that the machine-learning model 114 receives the document 200a as an input and outputs the term definition 202a.

In one or more embodiments, the definition extraction system 102 can analyze documents with unstructured text to determine a word sequence of the documents. For example, FIG. 2A illustrates that the document 200a includes a word sequence arranged in a plurality of sentences 201a-201n. In particular, the document 200a includes the sentences 201a-201n arranged in a specific order. In one or more embodiments, the definition extraction system 102 can determine the boundaries of the sentences 201a-201n based on natural language principles including punctuation, capitalization, or other elements of speech or writing that define separate sentences in a word sequence.

Additionally, FIG. 2A illustrates that each of the plurality of sentences 201a-201n includes a plurality of words. Specifically, a first sentence 201a includes a first plurality of words 204a-204n, a second sentence 201b includes a second plurality of words 206a-206n, and an nth sentence 201n includes an nth plurality of words 208a-208n. Accordingly, the word sequence of the document 200a includes words ordered according to the order of the sentences 201a-201n and according to an order of words within each sentence. For example, as shown in FIG. 2A, the first word in the word sequence is 204a and the last word in the word sequence is 208n.

In one or more embodiments, the definition extraction system 102 determines a relational word structure (e.g., a global dependency tree) for the document 200a by determining relationships of the words (e.g., words 204a-204n, words 206a-206n, and words 208a-208n) within the sentences 201a-201n. The definition extraction system 102 can utilize the machine-learning model 114 to determine whether the word sequence includes the term definition 202a based on the determined relationships of the words. For instance, the definition extraction system 102 may determine that the document 200a includes a term and a definition for the term within one or more of the sentences 201a-201n. In some embodiments, the definition extraction system 102 can also determine that the document 200a includes a qualifier associated with the definition that limits the application of the definition to a particular use-case.

Although FIG. 2A illustrates that the document 200a includes a plurality of sentences 201a-201n, the definition extraction system 102 can also utilize the machine-learning model 114 to extract term definitions from individual sentences. In particular, the definition extraction system 102 can determine a word sequence that includes a single sentence. The definition extraction system 102 can then utilize the machine-learning model 114 to determine whether the sentence includes a term definition and, if so, extract the term definition.

FIG. 2B illustrates additional detail for the machine-learning model 114. In particular, FIG. 2B illustrates that the machine-learning model 114 includes a plurality of layers for performing various functions associated with processing a document 200b to extract a term definition 202b. For instance, as illustrated, the machine-learning model 114 includes encoding layers 210, sequence classification layers 212, and sequence labeling layers 214.

In one or more embodiments, the machine-learning model 114 includes such layers to generate representations of words reflecting constraints during a definition extraction process. Specifically, the definition extraction system 102 can learn parameters of the layers of the machine-learning model 114 based on a plurality of loss functions to incorporate the constraints in the definition-extraction process. To illustrate, in some embodiments, the definition extraction system 102 applies layers of the machine-learning model 114 to generate representations of words in a word sequence reflecting a syntax constraint to contain information about the dependency path between a term and a definition. Such a syntax constraint causes the model to attend words that are syntactically related to the term and definition. For example, the definition extraction system 102 can incorporate the syntax constraint into the machine-learning model 114 based on a dependency loss function according to dependency paths between terms and definitions, as explained further below.

As a further example, in some embodiments, the definition extraction system 102 also applies layers of the machine-learning model 114 to generate latent label predictions reflecting a semantic constraint to cause the representations of the word sequence and the term and definition to be consistent. The definition extraction system 102 can thus abstractly eliminate words in a word sequence that are not semantically related to the term and definition. In one or more embodiments, the definition extraction system 102 incorporates the semantic constraint into the machine-learning model 114 based on a semantic loss function. As described in more detail below, the semantic loss function can be based on differences in semantic consistency captured between information in a term-definition pair and a representation of a word sequence as a whole.

In addition to a syntax constraint or a semantic constraint, in some cases, the definition extraction system 102 utilizes sentence level prediction to add additional loss for predicting definitional sequences. The definition extraction system 102 can thus improve final performance by enriching information about the entire sequence at the word level. For example, the definition extraction system 102 can utilize a classification loss function to learn parameters of layers for accurately classifying word sequences as definitional or non-definitional, as explained further below.

As shown in FIG. 2B, according to one or more embodiments, the encoding layers 210 generate representations of the words that include dependency information associated with the words. For example, the encoding layers 210 can include one or more neural networks to generate encoded vectors based on dependency path information. More specifically, the encoding layers 210 can utilize a global dependency tree associated with the word sequence of the document 200b to generate dependency-encoded-word vectors.

In response to generating dependency-encoded word vectors, the machine-learning model 114 can perform a plurality of additional operations via a plurality of additional layers. In particular, FIG. 2B illustrates that the output of the encoding layers 210 feeds into the sequence classification layers 212 and the sequence labeling layers 214. For example, the sequence classification layers 212 can utilize the dependency-encoded-word vectors to determine a sequence classification 216 for the word sequence. The sequence classification layers 212 can classify the word sequence to indicate a prediction of whether the word sequence in the document 200b includes a definition of a term based on dependency path information from the dependency-encoded-word vectors indicating a dependency path between a term and a definition.

As further shown in FIG. 2B, the sequence labeling layers 214 can utilize the dependency-encoded-word vectors to determine word labels 218 for words within a word sequence. To illustrate, the sequence labeling layers 214 can generate labels indicating whether each word in the word sequence relates to a term or definition. In one or more embodiments, the word labels 218 include labels indicating whether the words belong to a term, a definition, or qualifier associated with a definition. If the sequence labeling layers 214 determine that a particular word does not belong to a word type related to a definition, the sequence labeling layers 214 can assign a word label indicating that the word is not related to a definition.

Based on determining the sequence classification 216 and generating the word labels 218, the definition extraction system 102 extracts the term definition 202b in response to the machine-learning model 114 processing the document 200b. Specifically, the definition extraction system 102 can utilize the outputs of the sequence classification layers 212 (e.g., the sequence classification 216) and the sequence labeling layers 214 (e.g., the word labels 218) to extract the term definition 202b. For example, in response to determining that the sequence classification 216 indicates a prediction of the document 200b including a definition of a term, the definition extraction system 102 can extract the term definition 202b. Additionally, the definition extraction system 102 can extract the term definition according to boundaries indicated by the word labels 218.

Figure 3A:
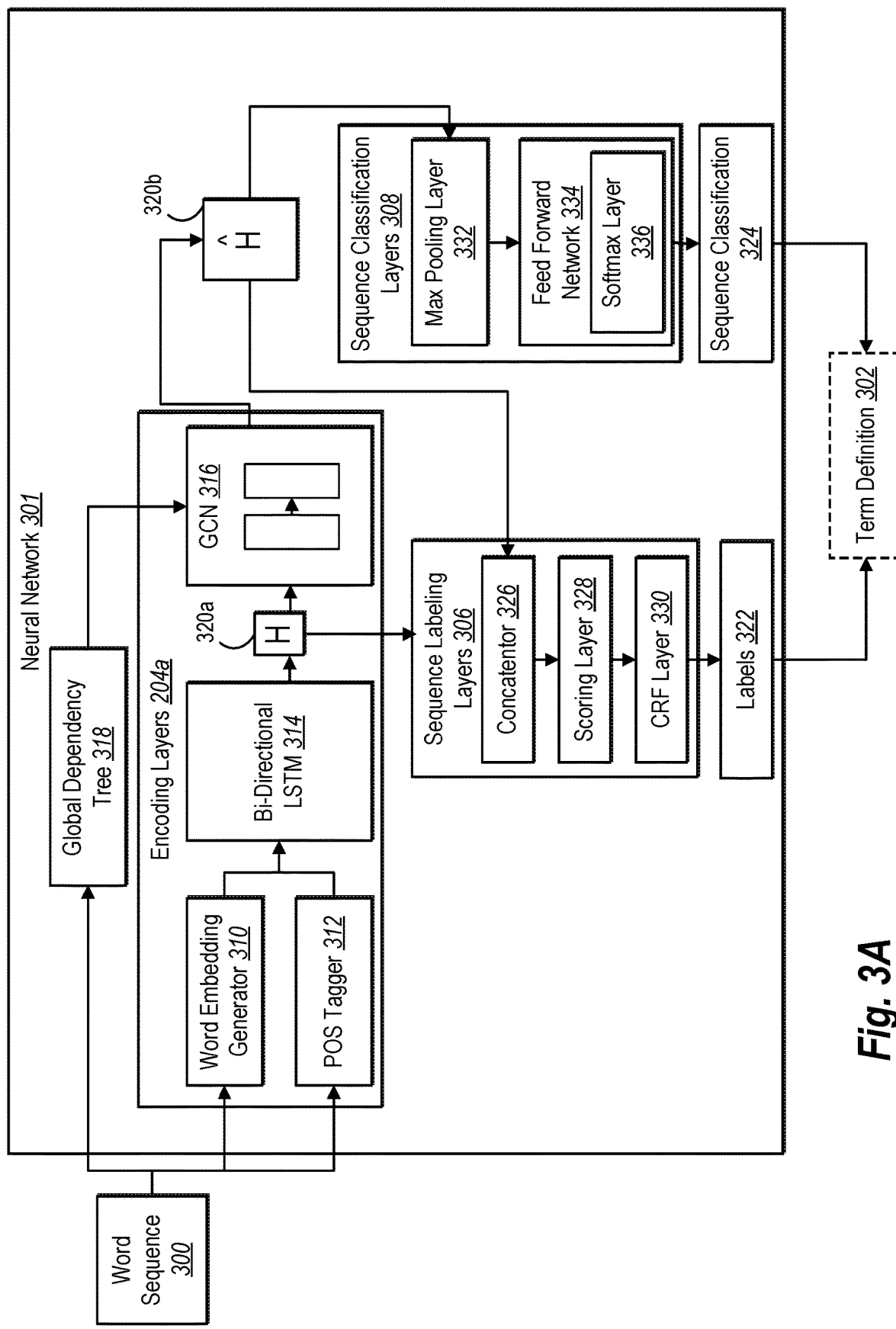
FIG. 3A illustrates a sequence-flow diagram of a definition extraction system utilizing machine-learning to extract a term-definition pair from a word sequence in accordance with one or more implementations.

FIG. 3A illustrates a more detailed view of the definition extraction system 102 processing a word sequence 300 to extract a term definition 302 from the word sequence 300 according to one or more embodiments. Specifically, FIG. 3A illustrates components of a plurality of layers of a single machine-learning model in the form of a neural network 301 that the definition extraction system 102 utilizes to extract the term definition 302 from the word sequence 300. For example, FIG. 3A illustrates components of encoding layers 304, components of sequence labeling layers 306, and components of sequence classification layers 308 as part of the neural network 301.

To extract the term definition 302 from the word sequence 300, FIG. 3A illustrates that the definition extraction system 102 generates abstracted representations of words within the word sequence 300 utilizing a word embedding generator 310. For instance, the definition extraction system 102 can utilize the word embedding generator 310 in the encoding layers 304 to generate word embeddings of words from within the word sequence 300. In one or more embodiments, a word embedding can include a vector that captures features of a particular word within the word sequence 300. The word embedding generator 310 can generate a word embedding, for example, by utilizing a neural network, a probabilistic model, or other method for generating a representation of a word in a real-valued feature vector. For example, the definition extraction system 102 can utilize a GloVe word embedding as described by Jeffrey Pennington, Richard Socher, and Christopher D. Manning in "Glove: Global vectors for word representation" in Empirical Methods in Natural Language Processing, 2014, which is herein incorporated by reference in its entirety.

Additionally, FIG. 3A illustrates that the definition extraction system 102 utilizes a parts-of-speech ("POS") tagger 312 to generate a POS tag for each word in the word sequence. Specifically, the encoding layers 304 can also include the POS tagger 312 to generate POS tags in connection with generating word embeddings for the words. For example, the POS tagger 312 can utilize natural language processing to determine an element of speech (noun, verb, adjective, etc.) to which each word belongs. The POS tagger 312 can generate POS tags with fine granularity to further clarify the speech element associated with each word in sentences of any complexity. For example, the POS tags can indicate whether a noun is plural or possessive, verb tense, role such as subject or object, and other grammatical aspects. In some embodiments, a POS tag can be an embedding (e.g., using a randomly initialized embedding) including a vector representing the specific element of speech.

After generating word embeddings and POS tags for words in the word sequence 300, the definition extraction system 102 can combine the word embedding and POS tag for each word to use in enriching the word representations with contextualized information in the word sequence 300. For example, in one or more embodiments, the definition extraction system 102 can concatenate the word embedding and POS tag for a given word into a single vector. The definition extraction system 102 can also represent the concatenated vectors for all words in the word sequence using a vector representation for the word sequence.

Furthermore, the definition extraction system 102 can use the vector representation of the word sequence to encode contextual information into word representations. For example, FIG. 3A illustrates that the encoding layers 304 include a bi-directional long-short-term-memory network ("bi-directional LSTM 314") to generate word representation vectors that include the contextualized information. To illustrate, the bi-directional LSTM 314 can generate a hidden vector sequence 320a including a plurality of word representations vectors based on the concatenated vectors for the words. Due to the sequential order of the vector values in the vector representation for the word sequence, the hidden vector sequence 320a can include encoded context information of neighboring words within the word sequence 300 into the word representations vectors. In accordance with certain embodiments, FIG. 3A illustrates the hidden vector sequence 320a as "H," which represents a plurality of word representation vectors generated by the bi-directional LSTM 314 for the words in the word sequence 300, as explained further below.

Figure 3B:
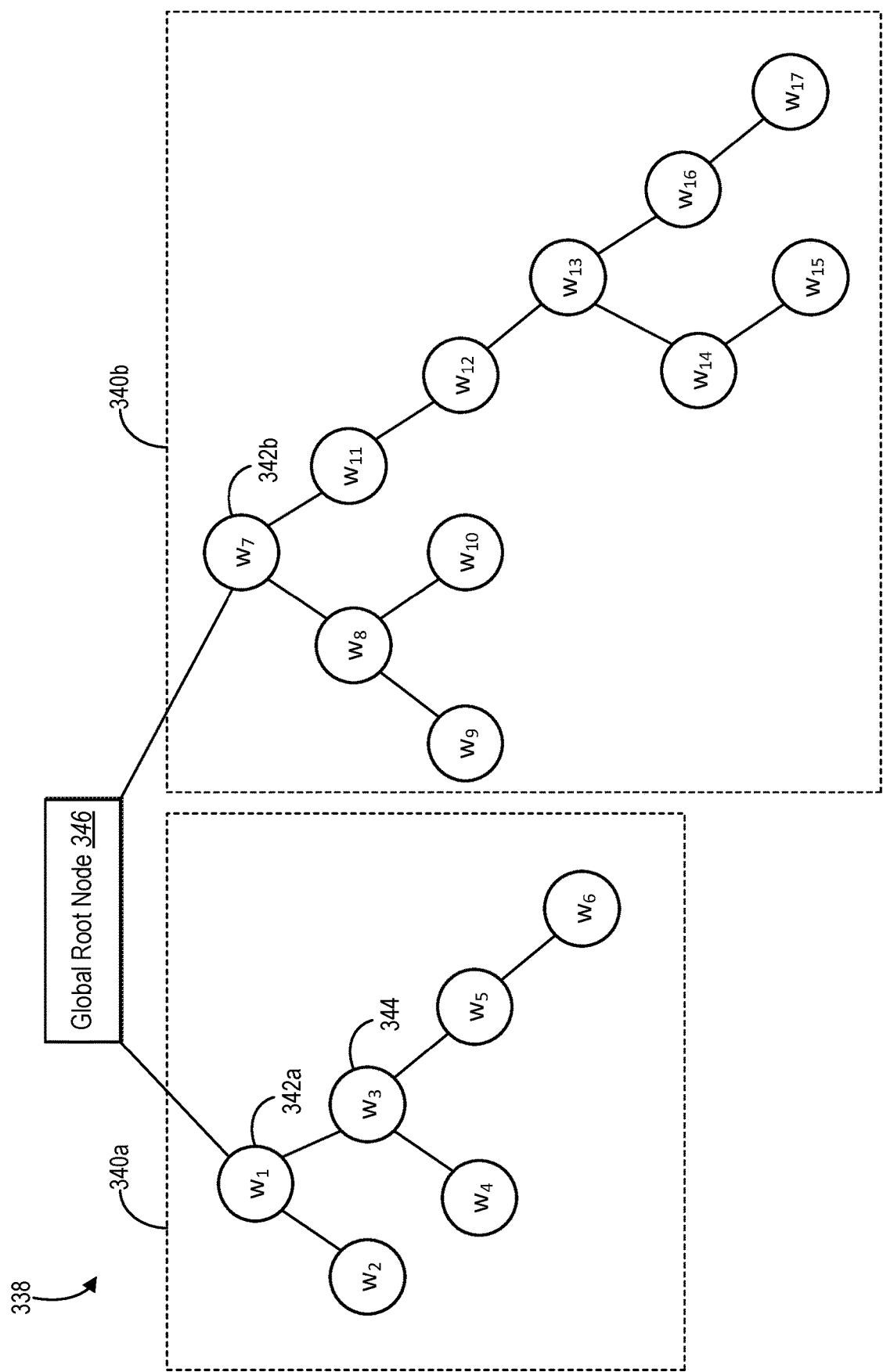
FIG. 3B illustrates a diagram of a global dependency tree for a word sequence in accordance with one or more implementations.

To further encode contextual information based on speech/grammatical relationships of words within the word sequence 300, the definition extraction system 102 can use word dependencies to further enrich the word representations. For example, FIG. 3A illustrates that the encoding layers 304 include a graph convolutional neural network ("GCN 316") to process the hidden vector sequence 320a output by the bi-directional LSTM 314 based on a global dependency tree 318 for the word sequence 300. In one or more embodiments, the definition extraction system 102 can determine the (undirected) global dependency tree 318 based on a grammatical structure of the word sequence 300. Specifically, the definition extraction system 102 can parse each sentence within the word sequence 300 to determine an individual dependency tree for the sentence. The definition extraction system 102 can then combine the dependency trees of all sentences in the word sequence 300 to generate the global dependency tree 318. FIG. 3B and the corresponding description provide additional detail related to a global dependency tree.

After the definition extraction system 102 generates the global dependency tree 318 for the word sequence 300, the definition extraction system 102 can provide the global dependency tree 318 to the GCN 316. Thus, the GCN 316 can receive as inputs the global dependency tree 318 and the output of the bi-directional LSTM 314 (e.g., the hidden vector sequence 320a). The GCN 316 can include one or more layers to exploit the dependency structure of the word sequence 300 based on the global dependency tree 318. For example, the GCN 316 can use the global dependency tree 318 to predict dependency paths between words in the word sequence 300.

In one or more embodiments, the GCN 316 includes two layers, each of which receives a hidden vector sequence (e.g., the first layer receives the hidden vector sequence 320a) and outputs another hidden vector sequence. By including two layers in the GCN 316, the definition extraction system 102 can generate dependency-encoded-word vectors that contain contextual information about words that are within a two-hop vicinity within the global dependency tree 318 of the corresponding word. To illustrate, the definition extraction system 102 can determine that a first word is within a two-hop vicinity of a second word in response to determining that the first word is at most two nodes away from the second word within the global dependency tree 318. Alternatively, the GCN 316 can include a different number of layers to incorporate contextual information about words that are within a greater or lesser distance from the corresponding word within the global dependency tree 318.

As illustrated in FIG. 3A, the GCN 316 of the encoding layers 304 outputs a hidden vector sequence (e.g., dependency-encoded-word vectors 320b). As mentioned, the dependency-encoded-word vectors 320b incorporate dependency path information for each word in the word sequence 300 based on the global dependency tree 318. In one or more embodiments, the definition extraction system 102 utilizes the dependency-encoded-word vectors 320b as inputs to the sequence labeling layers 306 and the sequence classification layers 308. FIG. 3A illustrates that the sequence labeling layers 306 use the dependency-encoded-word vectors 320b to generate labels 322 for the words in the word sequence 300. Furthermore, FIG. 3A illustrates that the sequence classification layers 308 use the dependency-encoded-word vectors 320b to generate a sequence classification 324 for the word sequence 300. In accordance with some embodiments, FIG. 3A illustrates the dependency-encoded-word vectors 320b as "R," which represents a plurality of dependency-encoded-word vectors generated by the GCN 316 for the words in the word sequence 300 based on the word representation vectors in the hidden vector sequence 320a ("H") and the global dependency tree 318.

More specifically, FIG. 3A illustrates that the sequence labeling layers 306 include a concatenator 326, a scoring layer 328, and a conditional random field layer ("CRF layer 330"). In one or more embodiments, the definition extraction system 102 provides the hidden vector sequence 320a and the dependency-encoded-word vectors 320b to the concatenator 326. The concatenator 326 can concatenate the hidden vector sequence 320a and the dependency-encoded-word vectors 320b to create a feature vector. The definition extraction system 102 can then use the feature vector to predict the labels 322 for the words.

FIG. 3A illustrates that the sequence labeling layers 306 provide the feature vector from the concatenator 326 to the scoring layer 328. In one or more embodiments, the scoring layer 328 can generate a score vector from the feature vector. In particular, the score vector can indicate possible word labels or tags for the words in the word sequence 300. Accordingly, in some cases, the score vector comprises a set of label scores corresponding to a set of possible labels for a particular word. Additionally, scoring layer 328 can generate the score vector to quantify the possibility of a given word in the word sequence 300 receiving each of the corresponding labels.

FIG. 3A further illustrates that the definition extraction system 102 can use the CRF layer 330 of the sequence labeling layers 306 to determine the probabilities of the possible label sequences corresponding to the words in the word sequence 300 from the score vector. For example, the CRF layer 330 can compute scores from the score vectors by capturing dependencies between possible labels in connection with dependencies captured in the hidden vector sequence 320a and the dependency-encoded-word vectors 320b. In one or more embodiments, the CRF layer 330 can generate a probability distribution of possible labels applying to each word in the word sequence 300 based on the score vector.

As further shown in FIG. 3A, the definition extraction system 102 can use the output of the CRF layer 330 (e.g., the probability distribution) to generate the labels 322. For example, the definition extraction system 102 can assign a label to each word in the word sequence 300 by selecting a possible label with the highest probability from the probability distribution. In at least some instances, the probability distribution includes all of the possible labels that the definition extraction system 102 can apply to each word (e.g., according to the BIO tagging scheme or other labeling scheme). In other embodiments, if the probability distribution does not include at least one possible label that meets a threshold value for a particular word, the definition extraction system 102 can assign another label to the word (e.g., a label not included in the possible labels). For example, the definition extraction system 102 may assign a label of "Other" to the given word in response to determining that the probability distribution does not include a value that meets the threshold value.

As mentioned, in addition to generating the labels 322, the definition extraction system 102 can also generate the sequence classification 324 for the word sequence 300. Specifically, the definition extraction system 102 utilizes the sequence classification layers 308 to generate the sequence classification 324. In particular, the definition extraction system 102 can predict a label for the word sequence 300 indicating whether the word sequence 300 includes a definition for a term. FIG. 3A illustrates that the sequence classification layers 308 include a max pooling layer 332 and a feed forward network 334. Additionally, the feed forward network 334 further includes a softmax layer 336.

In one or more embodiments, the definition extraction system 102 provides the dependency-encoded-word vectors 320b to the max pooling layer 332. For example, the definition extraction system 102 can utilize the max pooling layer 332 to generate a representation vector for the word sequence 300 by aggregating the dependency-encoded-word vectors using a max pooling operation. More specifically, the max pooling layer 332 outputs a sequence representation vector that represents the word sequence 300 as a whole while incorporating dependency information about the words in the word sequence 300 based on the global dependency tree 318. To illustrate, the sequence representation vector can capture important context features for classifying the word sequence 300.

After generating the sequence representation vector using the max pooling layer 332, FIG. 3A illustrates that the definition extraction system 102 can provide the sequence representation vector to the feed forward network 334. According to one or more embodiments, the feed forward network 334 can be a two-layer network that includes the softmax layer 336 at the end to generate a probability distribution associated with classifying the word sequence. In particular, the definition extraction system 102 can utilize the feed forward network 334 to generate a probability distribution that includes probabilities of the word sequence 300 being definitional or not definitional. For instance, the probability distribution can include probabilities indicating whether the word sequence 300 is definitional or not definitional based on the word sequence 300 including a definition of a term or not including a definition of a term. In some embodiments, the feed forward network 334 can generate the probability distribution based on whether the word sequence 300 includes at least one of a term, a definition, or a qualifier associated with the definition.

After generating the probability distribution, the definition extraction system 102 can generate the sequence classification 324 for the word sequence 300. For example, in response to generating the probability distribution using the sequence classification layers 308 (e.g., via the output of the feed forward network 334), the definition extraction system 102 can determine the sequence classification 324. To illustrate, in response to determining that the probability distribution indicates that the word sequence 300 is more likely to be definitional than not definitional, the definition extraction system 102 can generate the sequence classification 324 to indicate that the word sequence 300 includes a definition for a term. In one or more embodiments, the definition extraction system 102 can determine that the word sequence 300 is definitional in response to determining that the probability of the word sequence 300 is definitional (or a definitional probability) meets a minimum threshold value. Thus, the definition extraction system 102 may determine that the word sequence 300 is definitional based on a specific degree of certainty.

Based on generating the labels 322 and the sequence classification 324 from the word sequence using the plurality of layers of a neural network 301, the definition extraction system 102 can extract the term definition 302 from the word sequence 300. Specifically, in response to determining that the sequence classification 324 for the word sequence 300 indicates that the word sequence 300 includes a definition of a term, the definition extraction system 102 can extract the corresponding term definition 302 based on the labels 322. For instance, the definition extraction system 102 can determine the term definition 302 based on boundaries defined according to the labels 322.

To illustrate, the definition extraction system 102 can identify one or more words that correspond to a term, one or more words that correspond to a definition, and/or one or more words that correspond to a qualifier. The definition extraction system 102 can then construct the term definition 302 based on the identified words and the corresponding relationships from the word sequence 300 (e.g., using a Viterbi decoder). For example, the definition extraction system 102 can construct the term definition 302 by grouping words in each of the term, definition, or qualifier according to the original order of the words in the word sequence 300. Alternatively, the definition extraction system 102 can construct one or more of the term, definition, or qualifier according to word dependencies identified in the global dependency tree 318.

FIG. 3B illustrates an embodiment of a global dependency tree associated with a word sequence. As mentioned, the global dependency tree 338 can include one or more dependency trees associated with one or more sentences of the word sequence. For instance, FIG. 3B illustrates that the global dependency tree 338 includes a first dependency tree 340a associated with a first sentence from the word sequence and a second dependency tree 340b associated with a second sentence from the word sequence.

In one or more embodiments, the definition extraction system 102 can generate a dependency tree for a sentence in a word sequence by analyzing the speech/grammatical structure of the sentence. For example, the definition extraction system 102 can utilize natural language processing to parse text in the word sequence to determine sentence boundaries within the word sequence and sentence structure within each sentence. The definition extraction system 102 can then generate a dependency tree by connecting words based on specific grammatical relationships within the sentence.

To illustrate, as shown in FIG. 3B, the first dependency tree 340a includes a plurality of nodes associated with words from the first sentence. The definition extraction system 102 can determine a first root node 342a of the first sentence based on identifying a particular word in the first sentence (e.g., a verb). The first root node 342a identified from the first sentence indicates a root of the first dependency tree 340a from which all other nodes in the first dependency tree 340a depend. For instance, a child node 344 depends directly from the first root node 342a based on the determined sentence structure, and one or more additional nodes may further depend from child nodes.

FIG. 3B further illustrates that the second dependency tree 340b includes a plurality of nodes associated with words from the second sentence. The definition extraction system 102 can determine a second root node 342b of the second sentence based on identifying a particular word in the second sentence. The second root node 342b indicates a root of the second dependency tree 340b from which all other nodes in the second dependency tree 340b depend. The number of nodes in the second dependency tree 340b depends on the number of words in the second sentence. In one or more embodiments, the definition extraction system 102 parses a word sequence to generate a dependency tree for each sentence, as described by Luis Espinosa-Anke and Steven Schockaert in "Syntactically aware neural architectures for definition extraction" in Proceedings of the 2018 Conference of the North American Chapter of the Association for Computational Linguistics: Human Language Technologies, 2018, which is herein incorporated by reference in its entirety.

As shown in FIG. 3B, the nodes in the first dependency tree 340a do not depend from the nodes in the second dependency tree 340b, and vice versa. To capture possible dependency path information across a plurality of sentences within a word sequence, the definition extraction system 102 can link a plurality of dependency trees together. Specifically, FIG. 3B illustrates that the definition extraction system 102 generates a global root node 346 and connects the global root node 346 to the first root node 342a of the first dependency tree 340a and the second root node 342b of the second dependency tree 340b. Thus, the definition extraction system 102 can link the first dependency tree 340a to the second dependency tree 340b via the global root node 346.

By linking dependency trees of a plurality of sentences in a word sequence together via a global root node, the definition extraction system 102 can determine associations between words that are important to a term or definition across sentence boundaries. For instance, a word sequence including a plurality of sentences may include a term and a definition for the term that span more than one sentence. To illustrate, a term (e.g., a multi-word phrase) and/or a definition may include words from a plurality of sentences. Furthermore, a qualifier that defines the criteria for which the definition holds may be located in a different sentence or across a plurality of sentences. Thus, based on a global dependency tree, the definition extraction system 102 can determine the boundaries of a term definition across a plurality of sentences.

Although FIG. 3B illustrates that the global dependency tree 338 has two dependency trees (i.e., the first dependency tree 340a and the second dependency tree 340b) corresponding to two sentences of a word sequence, the definition extraction system 102 can generate any number of dependency trees depending on the number of sentences in the word sequence. For example, if a word sequence includes a single sentence, the definition extraction system 102 can utilize the dependency tree of the single sentence as the global dependency tree. Alternatively, if a word sequence corresponding to a document includes three or more sentences, the definition extraction system 102 can include dependency trees for all of the sentences and combine the dependency trees into a single global dependency tree.

In some embodiments, the definition extraction system 102 can divide a document into a plurality of word sequences to analyze the word sequences individually. In such cases, the definition extraction system 102 can generate a separate global dependency tree for each word sequence. The definition extraction system 102 can then use the individual global dependency trees to determine whether each separate word sequence includes a term definition. In addition, the definition extraction system 102 can analyze separate word sequences in a single document, and in response to determining that the word sequences do not include a term definition, combine two or more word sequences. The definition extraction system 102 can then analyze the combined word sequences together (e.g., by generating a global dependency tree for the combined word sequences) to determine whether the combined word sequences include a term definition.

Figure 4:
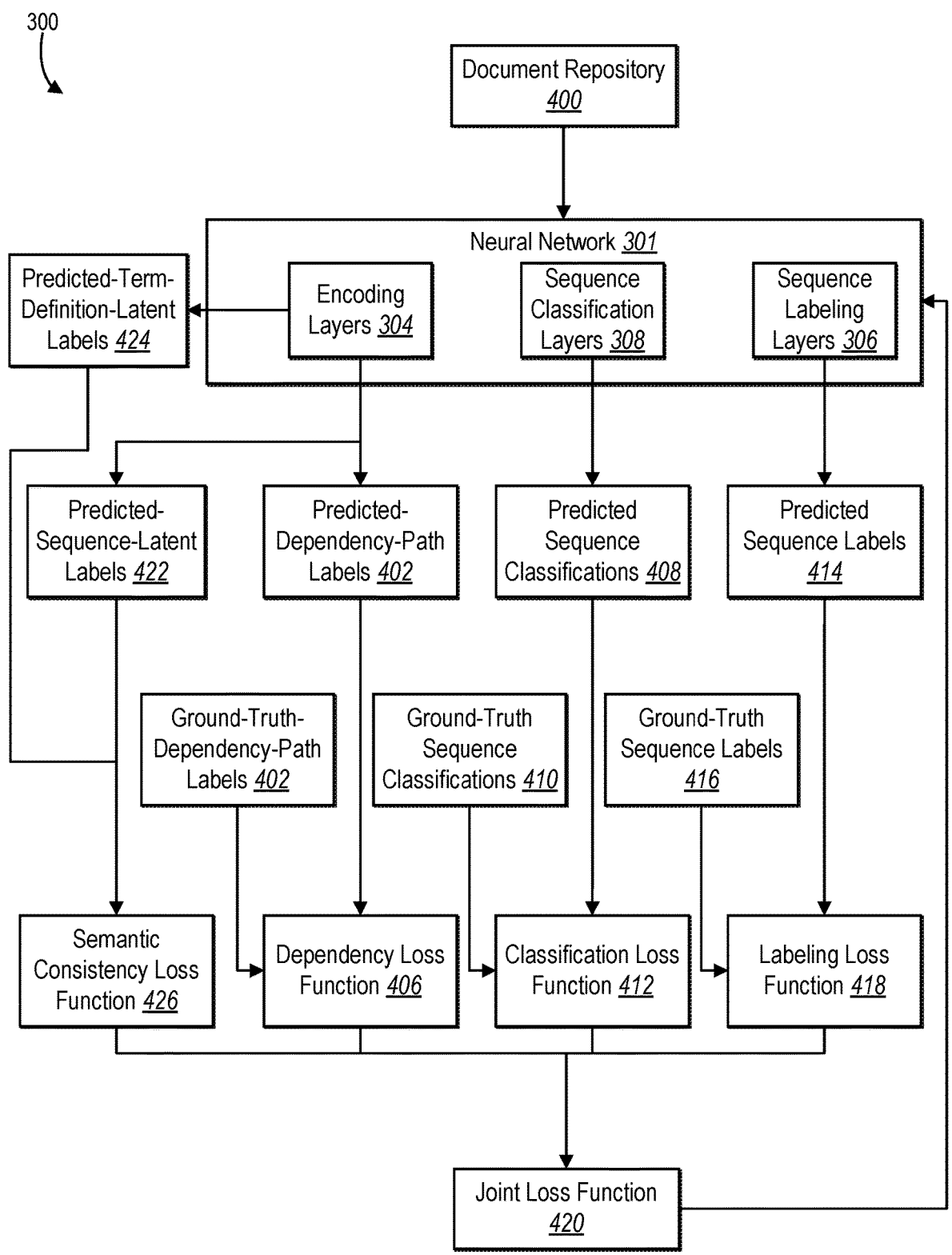
FIG. 4 illustrates a sequence-flow diagram of a definition extraction system jointly training layers of a machine-learning model utilizing a joint loss function in accordance with one or more implementations.

As previously mentioned, the definition extraction system 102 can also train a machine-learning model to extract term definitions from documents. FIG. 4 illustrates an embodiment of a process for training a machine-learning model using a training dataset. For example, the definition extraction system 102 can train the machine-learning model 114 of FIG. 1 in a joint training process that learns parameters over a plurality of layers of the machine-learning model 114. To train the machine-learning model 114 in the form of the neural network 301, the definition extraction system 102 can adjust or tune learning parameters of the layers of the neural network 301 according to a plurality of loss functions corresponding to the separate layers.

FIG. 4 illustrates that the neural network 301 receives documents from a document repository 400 as an input. In one or more embodiments, the documents are part of a corpus of documents used for training, verifying, and testing the neural network 301. To illustrate, the documents can include a training dataset, a verification dataset, and a testing dataset. The documents include text related to one or more domains of knowledge. The documents can also include labeled data indicating ground-truth information for use in training the neural network 301. According to some embodiments, the documents can include text related to a plurality of domains for training the neural network 301 to extract definitions from a variety of sources. Alternatively, the documents can include text related to a specific domain for training the neural network 301 to extract definitions from sources related to the specific domain (e.g., legal contracts, scientific papers).

As shown in FIG. 4, the neural network 301 includes the encoding layers 304, the sequence labeling layers 306, and the sequence classification layers 308. As described previously in relation to FIG. 3A, in some embodiments, each set of layers performs a specific function or set of functions in a process for extracting term definitions from word sequences. In one or more embodiments, the encoding layers 304 generate predicted-dependency-path labels 402 based on dependency-encoded-word vectors generated by the encoding layers 304 for words in the documents of the document repository 400. For instance, the definition extraction system 102 can utilize the lowest common ancestor of a term and a definition find the dependency path between the term and definition. A predicted-dependency-path label for a particular word can thus include a binary label indicating a prediction of whether the word belongs to the dependency path between the term and definition. To illustrate, the encoding layers 304 can further abstract the dependency-encoded-word vectors utilizing a two-layer feed forward network followed by a logistic regression model with sigmoid activation to predict dependency paths between terms and definitions in the documents.

FIG. 4 illustrates that the definition extraction system 102 can then compare the predicted-dependency-path labels 402 to ground-truth-dependency path labels 404 in connection with a dependency loss function 406. For example, in one or more embodiments, the definition extraction system 102 can utilize a binary cross-entropy loss function as the dependency loss function 406 to capture differences between the predicted-dependency-path labels 402 and the ground-truth-dependency-path labels 404. Specifically, the definition extraction system 102 can utilize the dependency loss function to determine a dependency loss indicating the differences between the predicted-dependency-path labels 402 and the ground-truth-dependency-path labels 404. Thus, the dependency loss function 406 can capture the accuracy of the predicted-dependency-path labels 402 from the encoding layers 304.

Additionally, FIG. 4 illustrates that the neural network 301 can utilize the sequence classification layers 308 to output predicted sequence classifications 408 for the documents. In particular, as noted previously, the sequence classification layers 308 can generate a prediction indicating whether a given word sequence (e.g., a document or portion of a document) includes a definition of a term. The predicted sequence classifications 408 can thus include a binary prediction that a particular document of the documents includes a definition of a term or does not include a definition of a term.

FIG. 4 further illustrates that the definition extraction system 102 can compare the predicted sequence classifications 408 to ground-truth sequence classifications 410 in connection with a classification loss function 412. Specifically, the classification loss function 412 can include a cross-entropy loss function that determines a classification loss by capturing differences between the predicted sequence classifications 408 and the ground-truth sequence classifications 410. Accordingly, the definition extraction system 102 can utilize the classification loss function 412 to determine the classification loss by capturing the accuracy of the predicted sequence classifications 408 output by the sequence classification layers 308.

Furthermore, FIG. 4 illustrates that the definition extraction system 102 can utilize the sequence labeling layers 306 to generate predicted sequence labels 414 for words in the documents of the document repository 400. For example, the sequence labeling layers 306 can generate a prediction indicating a label to which each word in a word sequence (e.g., a document or a portion of a document) belongs. As mentioned, labels can be based on a specific labeling scheme (e.g., a BIO labeling scheme or a BMEWO or BMEWO+ labeling scheme) according to a probability distribution indicating the likelihood of each word belonging to one of a set of possible labels.

As illustrated in FIG. 4, the definition extraction system 102 can then compare the predicted sequence labels 414 to ground-truth sequence labels 416 in connection with a labeling loss function 418. In one or more embodiments, the labeling loss function 418 can include a cross-entropy loss function that determines a labeling loss by determining any differences between the predicted sequence labels 414 and the ground-truth sequence labels 416. The labeling loss function 418 can thus capture the accuracy of the predicted sequence labels 414 output by the sequence labeling layers 306.

In some embodiments, the joint loss function 420 can further enforce consistency between representation of the word sequence overall and the term definition. For example, the definition extraction system 102 can predict latent labels from the entire word sequence and for only the term definition. If the information encoded in the sequence representation (e.g., the latent label for the word sequence) is semantically consistent with the information in the term definition, the latent labels for the sentence and for the term definition are the same (or approximately the same). The joint loss function 420 can thus include a function to capture any differences in the semantic consistency between the predicted sequence labels 414 and the ground-truth sequence labels 416 by utilizing the sequence representation.

For example, in one or more embodiments, the definition extraction system 102 can utilize the encoding layers 304 of the neural network 301 to generate predicted-sequence-latent labels 422 representing word sequences of documents in the document repository 400. The definition extraction system 102 can also utilize the encoding layers 304 of the neural network 301 to generate predicted-term-definition-latent labels 424 representing term-definition pairs in the word sequences. To illustrate, the neural network 301 can generate a predicted-sequence-latent label by max pooling over a sequence representation vector (e.g., a vector including word representation vectors of all words in a word sequence). Similarly, the neural network 301 can generate a predicted-term-definition-latent label by max pooling over a term-definition vector that includes word representation vectors for only words in the term-definition pair.

As further shown in FIG. 4, after determining the predicted-sequence-latent labels 422 and the predicted-term-definition-latent labels 424, the definition extraction system 102 can utilize a semantic consistency loss function 426 to determine a semantic consistency loss. Specifically, the definition extraction system 102 can determine the semantic consistency loss by determining differences between the predicted-sequence-latent labels 422 and the predicted-term-definition-latent labels 424. For example, if the information encoded in a sequence representation vector is semantically consistent with information encoded in the corresponding term-definition vector, the corresponding predicted-sequence-latent label should be the same as the corresponding predicted-term-definition-latent label.

After determining the separate loss functions for the different layers of the neural network 301, the definition extraction system 102 can generate a joint loss function 420. Specifically, the definition extraction system 102 can combine the dependency loss, the classification loss, the labeling loss, and the semantic consistency loss to generate a single joint loss function 420. In at least some embodiments, the definition extraction system 102 can apply different weights to the separate loss functions to improve the training of the machine-learning model. The definition extraction system 102 can then use the joint loss function 420 to jointly learn parameters of the neural network 301.

As described in relation to FIGS. 3A-3B and 4, the definition extraction system 102 can utilize a machine-learning model including a plurality of layers to jointly determine sequence labels and sequence classification of word sequences based on global dependency information for the word sequences. The definition extraction system 102 can also determine a joint loss function for jointly training the plurality of layers of the machine-learning model. A more detailed description of the process for determining dependency path information, sequence labels, and sequence classifications, and for jointly training a machine-learning model are described below.

For example, according to one or more embodiments, for a sequence labeling task given an input word sequence $W=w_1, w_2, \ldots, w_N$ (N being the number of words in the word sequence and $w_i$ represents the i-th word in the word sequence), the definition extraction system 102 can first assign a label $l_i$ to each word $w_i$ in the word sequence so that the resulting label sequence $L=l_1, l_2, \ldots, l_N$ represents a word-level prediction in W. In one or more embodiments, the definition extraction system 102 utilizes the BIO labeling schema to encode the label such that the definition extraction system 102 labels the words as B-Term, I-Term, B-Definition, I-Definition, B-Qualifier, I-Qualifier, and O (others). Second, the definition extraction system 102 can perform sequence classification by making a binary decision l for the overall word sequence to determine whether the word sequence contains any term definition (i.e., sentence-level prediction).

Specifically, the definition extraction system 102 can first prepare the input word sequence W for by transforming each word $w_i \in W$ into a real-valued vector. For example, the definition extraction system 102 can determine a concatenation of a pre-trained word embedding of $w_i$ and its corresponding POS tag to generate $e_i$. In at least some instances, the definition extraction system 102 can optimize the word embedding generator and the POS tagger utilizing a joint loss function (e.g., the joint loss function 420). The definition extraction system 102 can thus convert the input word sequence W into a sequence of representation vectors $E=e_1, e_2, \ldots, e_N$. As illustrated in FIG. 3A above, for example, the definition extraction system 102 can utilize encoding layers 204a to prepare the input word sequence W for generating representations of the words $w_i \in W$.

The definition extraction system 102 can subsequently feed the resulting representation vectors E into a bi-directional LSTM neural network to produce a hidden vector sequence $H=h_1, h_2, \ldots, h_N$ as the output. Each vector $h_1$ can represent the concatenation of the hidden vectors from the forward and backward LSTM neural networks at position i to capture the contextualized information for $w_i$. Furthermore, due to the sequential order in which the bi-directional LSTM processes words in the word sequence, a hidden vector $h_i \in H$ for $w_i$ tends to encode context information of closer neighboring words of $w_i$ within the word sequence more intensively than more distant words. The definition extraction system 102 can thus utilize the global dependency tree of W (e.g., the global dependency tree 338 of FIG. 3B) to link words in W to contextually important words. For example, the definition extraction system 102 can apply a GCN layer to the output of the bi-LSTM over the global dependency tree to enrich the word representations with information from the contextually important words. According to one or more embodiments, the definition extraction system 102 can utilize a GCN layer as described by Thomas N. Kipf and Max Welling in "Semi-Supervised Classification with Graph Convolution Networks" in ICLR, 2017, which is herein incorporated by reference in its entirety.

In one or more embodiments, the GCN layers can include a plurality of layers in which each layer receives a sequence of hidden vectors and returns another hidden vector sequence as the output. For example, for the input vector sequences $\hat{H}^t = \hat{h}_1^t, \hat{h}_2^t, \ldots, \hat{h}_N^t$ for the t-th GCN layer, the GCN computes the output vector sequence $$\hat{H}^{t+1} = \hat{h}_1^{t+1}, \hat{h}_2^{t+1}, \ldots, \hat{h}_N^{t+1} \text{ by } \hat{h}_i^{t+1} =$$

$$ReLU(W_t \hat{h}_i^{t+1}), \hat{h}_i^{t+1} = \frac{1}{\deg(i)} \sum_{j \in N(i)} \hat{h}_j^t,$$

where N(i) is the index set of neighbors of $w_i$ (including i itself), $W_t$ is the weight matrix for the t-th layer, and deg (i) is the degree of $w_i$ in the global dependency tree. As mentioned previously, the definition extraction system 102 can utilize a two-layer GCN in which the input for the first GCN layer is the sequence of hidden vectors H=$h_1$, $h_2$, ..., $h_N$ from the bi-directional LSTM neural network (e.g., the hidden vector sequence 320a, shown in FIG. 3A) and the output vector sequence of the last GCN layer (i.e., the second layer) is denoted by $\hat{H}=\hat{h}_1, \hat{h}_2, \ldots, \hat{h}_N$ (e.g., the dependency-encoded-word vectors 320b, shown in FIG. 3B). The resulting dependency-encoded-word vector $\hat{h}_i$ for $w_i$ encodes contextualized information augmented with the dependency structure for the important context words in W based on the global dependency tree.

Once the definition extraction system 102 has generated the dependency-encoded-word vectors for the words in the word sequence, the definition extraction system 102 can then generate sequence labels and a sequence classification based on the dependency-encoded-word vectors. For example, when generating sequence labels, the definition extraction system 102 can assign a label for each word in the word sequence to encode the boundaries of the terms and definitions (if any). To illustrate, as shown in FIG. 3A above, the neural network 301 includes the sequence labeling layers 306 to generate labels for words in a word sequence. In particular, for each word $w_i \in W$, the definition extraction system 102 can concatenate $h_i$ and $\hat{h}_i$ to generate $h'_i$ (i.e., $h'_i = [h_i, \hat{h}_i]$) as a feature vector for predicting labels for $w_i$. The definition extraction system 102 can transform the feature vector $h'_i$ into a score vector $S_i$ with dimensions corresponding to the possible word labels/tags (e.g., the various BIO labels) and quantifying the possibility for $w_i$ receiving the corresponding labels as: $S_i = W_s h'_i$, where $W_s$ is the trainable weight matrix. Additionally, in one or more embodiments, the definition extraction system 102 can determine $|S_i|=7$ (e.g., based on the BIO labels previously mentioned).

After determining the score vectors $S_i$, the definition extraction system 102 can feed the score vectors $S_i$ for the words $w_i$ into a CRF layer to quantify the probabilities of the possible label sequences $\hat{l}_1, \hat{l}_2, \ldots, \hat{l}_N$ for the words in W. The CRF layer can capture the dependencies between the BIO labels that are useful for other sequence labeling tasks in natural language processing. For example, the definition extraction system 102 can determine the score for a possible label sequence $\hat{l}_1, \hat{l}_2, \ldots, \hat{l}_N$ for W as: Score $(\hat{l}_1, \hat{l}_2, \ldots, \hat{l}_N | W) = \Sigma_{j=1}^{N}(S_{\hat{l}_j} + T_{\hat{l}_{j-1}, \hat{l}_j})$, where T is the trainable transition matrix for the BIO labels. The CRF can then compute the normalization score to form a probability distribution $P_{labeling}(\hat{l}_1, \hat{l}_2, \ldots, \hat{l}_N | W)$ for the possible label sequences. In one or more embodiments, the definition extraction system 102 utilizes dynamic programming to determine the probability distribution, as described by John Lafferty, Andrew McCallum, and Fernando Pereira in "Conditional Random Fields: Probabilistic Models for Segmenting and Labeling Sequence Data" in ICML, 2001. In addition to generating the probability distribution, the definition extraction system 102 can determine a labeling loss function as: $L_{labeling} = -\log P_{labeling}(\hat{l}_1, \hat{l}_2, \ldots, \hat{l}_N | W)$ where L=$\hat{l}_1$, $\hat{l}_2, \ldots, \hat{l}_N$ represents the golden label sequence for W. As previously described, FIG. 4 illustrates that the definition extraction system 102 can determine a labeling loss based on differences between predicted labels and ground-truth labels. The definition extraction system 102 can then utilize a decoder (e.g., a Viterbi decoder) to infer the sequence of labels with the highest score for the word sequence.

Additionally, the definition extraction system 102 can perform sequence classification for the word sequence W to indicate whether W contains a term-definition pair. For instance, FIG. 3A above illustrates that the neural network 301 includes the sequence classification layers 308 to generate a sequence classification for a word sequence. Specifically, the definition extraction system 102 determines a sequence representation vector for the word sequence as $\hat{h}^s$ by aggregating the dependency-encoded-word vectors $\hat{H}=\hat{h}_1, \hat{h}_2, \ldots, \hat{h}_N$ via a max pooling operation $\hat{h}^s = \text{Max\_Pooling}(\hat{h}_1, \hat{h}_2, \ldots, \hat{h}_N)$. Because the GCN utilizes the global dependency tree to generate the dependency-encoded-word vectors, the aggregated vector $\hat{h}^s$ can capture the most important contextual features. The definition extraction system 102 can then feed $\hat{h}^s$ into a two-layer feed forward network with a softmax layer at the output to compute the probability distribution $P_{classification}(.|W)$ over the two possibilities for the label of W (i.e., definitional or not definitional). The definition extraction system 102 can utilize the probability distribution for both prediction and training. The definition extraction system 102 can also determine a classification loss function $L_{classification} = -\log P_{classification}(l|W)$, where l is the true definitional label for W.

As mentioned, the definition extraction system 102 determines the sequence labeling and sequence classification based on dependency information from the global dependency tree. The definition extraction system 102 can identify words along a shortest dependency path SP between a term and a definition in W to use in assigning a binary label $d_i$ (a predicted-dependency-path label) for each word $w_i \in W$, where $d_i = 1$ if $w_i$ belongs to the dependency path and 0 otherwise. The definition extraction system 102 can then generate the dependency-encoded-word vectors $\hat{H}$ to be aware of terms and definitions by using the dependency-encoded-word vector $\hat{h}_i$ to predict the membership of $w_i$ on the dependency path SP. Specifically, the definition extraction system 102 can input the vector $\hat{h}_i$ corresponding to $w_i$ into a two-layer feed forward network with a softmax layer at the output to generate the distribution $P_i^{dep}(.|W)$ over the two possibilities of $w_i$ belonging to SP or not. The definition extraction system 102 can then optimize a dependency loss function $L_{dep}$ based on the distributions $P_i^{dep}(.|W)$ and the ground-truth sequence label D=$d_1, d_2, \ldots, d_N$ (i.e., a vector of ground-truth-dependency-path labels) for the words in Was: $L_{dep} = -\Sigma_{i=1}^{N} \log P_i^{dep}(d_i|W)$. As noted previously with respect to FIG. 4, the definition extraction system 102 can determine a dependency loss based on the difference between the predicted-dependency-path labels and the ground-truth labels.

Additionally, because a term and definition in W may each have more than one word, the definition extraction system 102 can utilize the lowest node among the common ancestors of the term-definition pair to determine the dependency path SP. For word sequences that do not contain any term definitions, the definition extraction system 102 can assign $d_i = 0$ for every word in the word sequences.

In one or more embodiments, the definition extraction system 102 can further enforce consistency between the representation vectors for the entire word sequence and the term definition in the word sequence W. Specifically, the definition extraction system 102 encourages the sequence representation vector to focus on the information about the term and definition presented in the word sequence to reduce the effect of irrelevant words in the sequence representation vector. The definition extraction system 102 can generate representation vectors $h^s$ and $h^{TD}$ representing the sequence and the term-definition pair, respectively via a max pooling operation: $h^s$=Max_Pooling($h_1$, $h_2$, . . . , $h_N$) and $h^{TD}$=Max_Pooling($h_i|i\in l$).

Based on the foregoing, the definition extraction system 102 can generate latent labels for the sequence and the term-definition pair by selecting a fixed number U of latent labels. The definition extraction system 102 can then feed $h^s$ and $h^{TD}$ into a feed forward network with a softmax layer at the output to generate probability distributions $P_s^{sem}(.|W)$ and $P_{TD}^{sem}(.|W)$, respectively, over the U latent labels. The definition extraction system 102 can further generate the latent label $l_{TD}$ predicted by $h^{TD}$ via the argmax function: $l_{TD}$=argmax$_y P_{TD}^{sem}(y|W)$. The definition extraction system 102 can subsequently use $l_{TD}$ as the ground-truth latent label to compute the negative log-likelihood $L_{sem}$ based on the $P_s^{sem}(.|W)$ distribution that the definition extraction system 102 optimizes in the loss function: $L_{sem}$=-log $P_s^{sem}(l_{TD}|W)$. For example, as shown in FIG. 4 above, the definition extraction system 102 can generate a semantic consistency loss based on the semantic consistency between the word sequence and the term-definition pair.

Accordingly, in some embodiments, the definition extraction system 102 can determine a joint loss function for training the machine-learning model as: $L_{all}$=$\alpha L_{labeling}$+$\beta L_{classification}$+$\gamma L_{dep}$+$\eta L_{sem}$, where the definition extraction system 102 can determine $\alpha$, $\beta$, $\gamma$, and $\eta$ as weights of the different loss values. In one or more embodiments, the definition extraction system 102 can select the weights empirically and tune the weights based on the training datasets.

To test the accuracy and efficacy of the definition extraction system 102, researchers performed a series of experiments to measure the accuracy of different versions of the definition extraction system 102 and existing informational-extraction systems. As part of some of the experiments, the definition extraction system 102 processed a corpus of legal documents that included 32,799 word sequences. Table 1 below illustrates the labels for a training dataset for training neural network layers, a development dataset for fine-tuning hyper parameters of the neural network layers (e.g., weights associated with loss functions, number of neurons in the feed forward networks), and a testing dataset for testing the performance of the neural network layers.

| Label | Training | Development | Testing |
| --- | --- | --- | --- |
| B-Term | 3352 | 483 | 417 |
| I-Term | 7547 | 1059 | 950 |
| B-Definition | 2918 | 377 | 366 |
| I-Definition | 87440 | 11621 | 10429 |
| B-Qualifier | 355 | 50 | 29 |
| I-Qualifier | 3665 | 502 | 271 |

Using the labels above, the definition extraction system 102 also processed documents in two definition datasets: Word-Class Lattices and WOO. The Word-Class Lattices ("WCL") dataset is described by Roberto Navigli and Paola Velardi in "Learning Word-Class Lattices for Definition and Hypernym Extraction," in Proceedings of the 48th Annual Meeting of the Association for Computational Linguistics, 1318-1327 (Association for Computational Linguistics, 2010). The WOO dataset is described by Yiping Jin, Min-Yen Kan, Jun-Ping Ng, and Xiangnan He in "Mining Scientific Terms and their Definitions: A Study of the ACL Anthology," in Proceedings of the 2013 Conference on Empirical Methods in Natural Language Processing, 780-790 (2013). The WCL dataset includes 1871 definitional and 2847 non-definitional word sequences and has annotations for terms to be defined and definitions for the terms. The WOO corpus includes 731 definitional and 1454 non-definitional samples and has word level annotations for terms and definitions.

During the series of experiments, the definition extracted system 102 used hyper parameters by setting the word embedding and POS embedding to 300 and 30, respectively, as hyper parameters. Furthermore, the hyper parameter for hidden layers of the bi-directional LSTM, GCN, and feed forward networks are 200. Furthermore, the number of latent labels is set to 2. To train the machine-learning model, the definition extraction system 102 also utilized the Adam optimization algorithm with a learning rate of 0.003, as described by Diederik P. Kingma and Jimmy Ba in "Adam: A Method for Stochastic Optimization," in 3rd International Conference for Learning Representations, San Diego (2015), which is hereby incorporated by reference in its entirety.

For the experiments with results shown in Tables 2-3, the definition extraction system 102 performs sequence labeling and sequence classification on the different datasets. To perform sequence classification, the definition extraction system 102 uses the output of sequence-level prediction (e.g., sequence classification) by the sequence classification layers. For the task of sequence labeling, the definition extraction system 102 utilizes two baselines. Specifically, the first baseline is the bi-directional LSTM-CRF model ("BiLSTM-CRF"). In this model, there is no syntactical or semantic constraint, and the model does not perform any sequence-level prediction. The second baseline is the bi-directional LSTM-GCN-CRF model ("BiLSTM-GCN-CRF"). This model further includes a GCN to learn the structure of the input text and concatenates the outputs of the bi-directional LSTM and GCN. The definition extraction system 102 uses macro-precision, macro-recall, and macro-F1 measurements among all six labels of Table 1 to evaluate the sequence-labeling performance.

For the sequence classification operation, the results are compared with a conventional model described by Luis Espinosa-Anke and Steven Schockaert in "Syntactically Aware Neural Architectures for Definition Extraction," in Proceedings of the 2018 Conference of the North American Chapter of the Association for Computational Linguistics: Human Language," Technologies, Volume 2 (Short Papers), 378-385 (2018). The conventional model uses an LSTM and a convolutional neural network to extract local and global features from text. The conventional model further enriches the extracted features using a head-modifier relation from a dependency tree.

Table 2 below illustrates the results for the sequence labeling on the test sets. As shown, the definition extraction system 102 utilizing the full machine-learning model ("Full Model") described in relation to FIG. 3A provides an improvement on the baseline by 4.3% in macro-F1.

| Model | Precision | Recall | F1 |
| --- | --- | --- | --- |
| BiLSTM-CRF | 63.2 | 73.5 | 67.4 |
| BiLSTM-GCN-CRF | 63.1 | 73.5 | 67.2 |
| Full Model | 66.1 | 76.1 | 71.7 |

Table 3 below further illustrates a comparison of the full machine-learning model with the conventional model ("Syntax Aware") on the three datasets described above (i.e., the legal dataset ("Contracts"), WOO, and WCL).

| Dataset | Contracts | | | W00 | | | WCL | | |
|---|---|---|---|---|---|---|---|---|---|
| Model | Precision | Recall | F1 | Precision | Recall | F1 | Precision | Recall | F1 |
| Syntax Aware | 83.3 | 84.9 | 84.1 | 52.0 | 67.6 | 57.4 | 94.2 | 94.2 | 94.2 |
| Full Model | 88.1 | 95.6 | 91.7 | 67.0 | 68.0 | 67.2 | 99.7 | 99.4 | 99.5 |

Furthermore, Table 4 below illustrates the contribution of each component of the machine-learning model of FIG. 3A according to an ablation study on the performance. Specifically, Table 4 illustrates the results of the model when eliminating each component of the model (e.g., by excluding specific layers of the neural network during a definition extraction process)—the full machine-learning model ("Full"), the full model without dependency path prediction ("Full-Dependency"), the full model without latent label prediction ("Full-Latent"), and the full model without sequence-level prediction ("Full-Sequence").

| Model | Precision | Recall | F1 |
|---|---|---|---|
| Full Model | 66.1 | 76.1 | 71.7 |
| Full-Dependency | 65.9 | 75.8 | 70.0 |
| Full-Latent | 63.6 | 74.5 | 68.1 |
| Full-Sequence | 62.3 | 75.4 | 68.5 |

As described in relation to FIGS. 3A-3B, the definition extraction system 102 can perform operations for utilizing machine-learning to extract term definitions from documents based on global dependency information. The operations allow the definition extraction system 102 to more accurately and flexibly extract term definitions across a plurality of sentences in documents. Accordingly, the acts and operations illustrated and described above in relation to FIG. 3A can provide the corresponding acts (e.g., structure) for a step for jointly determining a sequence classification for the word sequence and labeling for words within the word sequence.

Figure 5:
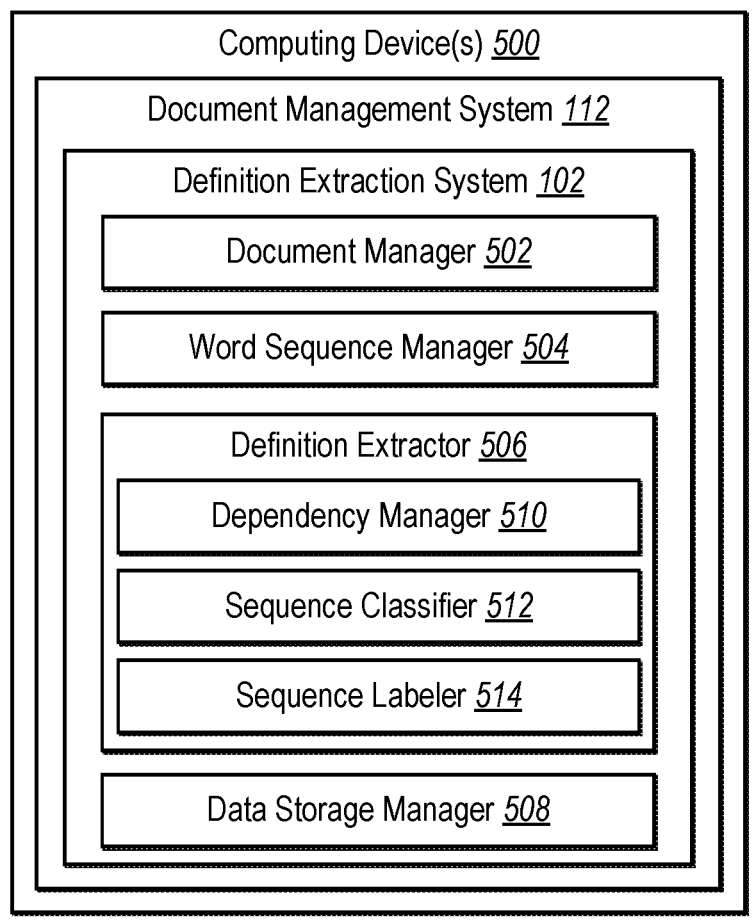
FIG. 5 illustrates a diagram of the definition extraction system of FIG. 1 in accordance with one or more implementations.

FIG. 5 illustrates a detailed schematic diagram of an embodiment of the definition extraction system 102 described above. As shown, the definition extraction system 102 can be implemented in the document management system 112 on computing device(s) 500 (e.g., a client device and/or server device as described in FIG. 1, and as further described below in relation to FIG. 7). Additionally, the definition extraction system 102 can include, but is not limited to, a document manager 502, a word sequence manager 504, a definition extractor 506, and a data storage manager 508. The definition extractor 506 can further include a dependency manager 510, a sequence classifier 512, and a sequence labeler 514. The definition extraction system 102 can be implemented on any number of computing devices. For example, the definition extraction system 102 can be implemented in a distributed system of server devices for managing digital content. The definition extraction system 102 can also be implemented within one or more additional systems. Alternatively, the definition extraction system 102 can be implemented on a single computing device such as a single client device.

In one or more embodiments, each of the components of the definition extraction system 102 is in communication with other components using any suitable communication technologies. Additionally, the components of the definition extraction system 102 can be in communication with one or more other devices including other computing devices of a user, server devices (e.g., cloud storage devices), licensing servers, or other devices/systems. It will be recognized that although the components of the definition extraction system 102 are shown to be separate in FIG. 7, any of the subcomponents may be combined into fewer components, such as into a single component, or divided into more components as may serve a particular implementation. Furthermore, although the components of FIG. 5 are described in connection with the definition extraction system 102, at least some of the components for performing operations in conjunction with the definition extraction system 102 described herein may be implemented on other devices within the environment.

The components of the definition extraction system 102 can include software, hardware, or both. For example, the components of the definition extraction system 102 can include one or more instructions stored on a computer-readable storage medium and executable by processors of one or more computing devices (e.g., the computing device(s) 500). When executed by the one or more processors, the computer-executable instructions of the definition extraction system 102 can cause the computing device(s) 500 to perform the operations described herein. Alternatively, the components of the definition extraction system 102 can include hardware, such as a special purpose processing device to perform a certain function or group of functions. Additionally, or alternatively, the components of the definition extraction system 102 can include a combination of computer-executable instructions and hardware.

Furthermore, the components of the definition extraction system 102 performing the functions described herein with respect to the definition extraction system 102 may, for example, be implemented as part of a stand-alone application, as a module of an application, as a plug-in for applications, as a library function or functions that may be called by other applications, and/or as a cloud-computing model. Thus, the components of the definition extraction system 102 may be implemented as part of a stand-alone application on a personal computing device or a mobile device. Alternatively, or additionally, the components of the definition extraction system 102 may be implemented in any application that provides vector-based graphics editing, including, but not limited to ADOBE® DOCUMENT CLOUD®, ADOBE® SENSEI, or ADOBE® EXPERIENCE MANAGER. "ADOBE" and "DOCUMENT CLOUD" are either registered trademarks or trademarks of Adobe Inc. in the United States and/or other countries.

The definition extraction system 102 can include a document manager 502 to manage digital content items including text documents. For example, the document manager 502 can manage storage or access of text documents for extracting definitions from the documents. The document manager 502 can also manage data associated with the documents such as mappings between the documents and definitions extracted from the documents.

The definition extraction system 102 can include a word sequence manager 504 to determine word sequences from documents for extracting definitions from the documents. For example, the word sequence manager 504 can utilize language processing to parse word sequences in text documents. The word sequence manager 504 can also analyze word sequences to determine dependency trees associated with the word sequences based on relationships determined using language processing.

The definition extraction system 102 can also include a definition extractor 506 to extract definitions from documents. For example, the definition extractor 506 can include a dependency manager 510 to first determine dependency information associated with words. The dependency manager 510 can include one or more machine-learning model layers to generate representations of words within a word sequence and encode dependency information from a dependency tree into the word representations. To illustrate, the dependency manager 510 can generate dependency-encoded-word vectors, as previously described.

Additionally, the definition extractor 506 can include a sequence classifier 512 to generate sequence classifications for word sequences from documents. In particular, the sequence classifier 512 can include one or more machine-learning-model layers to generate sequence classifications indicating whether word sequences include a definition of a term. The sequence classifier 512 can utilize the dependency-encoded-word vectors from the dependency manager 510 to determine whether a given word sequence is definitional or not definitional.

Furthermore, the definition extractor 506 can include a sequence labeler 514 to label words in word sequences from documents. For example, the definition extraction system 102 can utilize representations of words and the dependency-encoded-word vectors of the words to assign labels indicating whether the words belong to a particular label category. Specifically, the sequence labeler 514 can label words as belonging to a term, a definition, a qualifier, or other.

The definition extractor 506 can use the information from the dependency manager 510, the sequence classifier 512, and the sequence labeler 514 to determine whether a given word sequence includes a term definition. The definition extractor 506 can also use the information to determine boundaries of a term definition, as well as any conditions under which the term definition holds. The definition extractor 506 can also use the information to further train the layers of the machine-learning model.

Additionally, the definition extraction system 102 also includes a data storage manager 508 (that comprises a non-transitory computer memory/one or more memory devices) that stores and maintains data associated with digital content items. For example, the data storage manager 508 can store information associated with extracting term definitions from documents. To illustrate, the data storage manager 508 can store word sequences, dependency trees, inputs and outputs of machine-learning models and/or machine-learning model layers, word labels, sequence classifications, and extracted term definitions.

Figure 6:
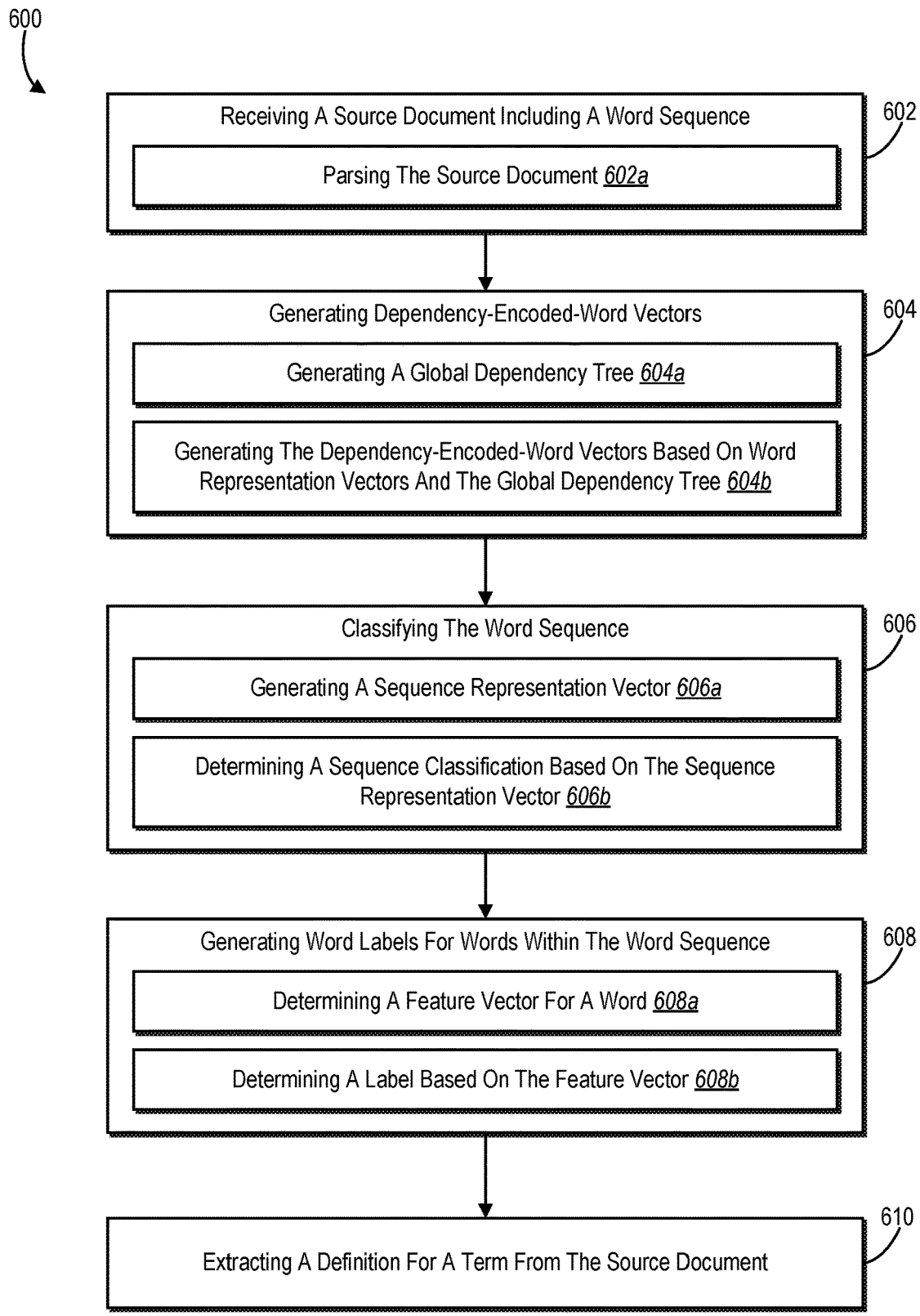
FIG. 6 illustrates a flowchart of a series of acts for utilizing machine learning to extract a definition of a term from a source document in accordance with one or more implementations.

Turning now to FIG. 6, this figure shows a flowchart of a series of acts 600 of utilizing machine-learning to extract term definitions based on global dependency information. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown, the series of acts 600 includes an act 602 of receiving a source document including a word sequence. For example, act 602 involves receiving a source document comprising a word sequence arranged in one or more sentences. In one or more embodiments, the source document comprises text arranged in a plurality of sentences. Act 602 can involve an act 602a of parsing the source document. For example, act 602a can involve parsing the source document to identify a plurality of words in the plurality of sentences.

The series of acts 600 can include an act 604 of generating dependency-encoded-word vectors. For example, act 604 can include an act 604a of generating a global dependency tree. Act 604a can involve generating, utilizing the machine-learning model, dependency-encoded-word vectors indicating a dependency path between the term and the definition among the word sequence utilizing a global dependency tree. For example, the series of acts 600 can include generating the global dependency tree by parsing, utilizing natural language processing, a plurality of sentences of the word sequence to determine a plurality of dependency trees for the plurality of sentences. The series of acts 600 can then include generating the global dependency tree by linking the plurality of dependency trees using a global root node.

Additionally, act 604 can also include an act 604b of generating the dependency-encoded word vectors based on word representation vectors and the global dependency tree. For example, act 604b can involve generating the dependency-encoded-word vectors by generating, utilizing a first set of encoding layers from the machine-learning model, a word representation vector for a particular word in the word sequence based on a word embedding and a parts-of-speech embedding vector associated with the particular word. For example, the first set of encoding layers can include a bi-directional long-short-term-memory network. The series of acts 600 can also include generating the dependency-encoded-word vectors by generating, utilizing a second set of encoding layers from the machine-learning model, a dependency-encoded-word vector for the particular word based on the word representation vector for the particular word and word representation vectors for neighboring words in the global dependency tree. For example, the second set of encoding layers can include a graph convolutional neural network.

The series of acts 600 also includes an act 606 of classifying the word sequence. For example, act 606 involves classifying, utilizing a machine-learning model, the word sequence as comprising a definition for a term. Act 606 can include an act 606a of generating a sequence representation vector. For example, act 606a can involve generating, utilizing max pooling, a sequence representation vector for the word sequence by aggregating the dependency-encoded-word vectors for the words in the word sequence. Act 606 can then include an act 606b of determining a sequence classification based on the sequence representation vector. For example, act 606b can involve determining, utilizing a feed forward network, that the word sequence comprises the definition for the term based on the sequence representation vector. For example, act 606 can involve determining that the word sequence comprises the definition for the term in response to determining that the word sequence comprises a portion of the term, a portion of the definition, or a portion of a qualifier associated with the definition.

Additionally, the series of acts 600 includes an act 608 of generating labels for words within the word sequence. For example, act 608 involves generating, utilizing the machine-learning model, labels for words within the word sequence corresponding to the term and the definition. Act 608 can include an act 608a of determining a feature vector for a word. For example, act 608a can involve determining, for a particular word in the word sequence, a feature vector by concatenating the word representation vector and the dependency-encoded-word vector of the particular word. Act 606 can then include an act 608b of determining a label based on the feature vector. For example, act 608b can involve determining a label for the particular word based on the feature vector, wherein the label indicates that the particular word belongs to the term, the definition, a qualifier for the definition, or a non-definitional word.

Act 608 can also involve converting the feature vector into a score vector corresponding to a set of possible labels for the particular word. Act 608 can then involve determining, utilizing a conditional random field model, the label for the particular word according to the score vector.

The series of acts 600 further includes an act 610 of extracting a definition for a term from the source document. For example, act 610 involves extracting the definition for the term from the source document based on classifying the word sequence and the labels for the words within the word sequence. Act 610 can include extracting at least a first portion of the definition from a first sentence within the word sequence and at least a second portion of the definition from a second sentence within the word sequence.

As part of act 610, or as an additional act, the series of acts 600 can include determining a latent sequence label based on a sequence representation vector for the word sequence and a latent term-definition label based on word representation vectors for the term and the definition. The series of acts 600 can then include determining that a sequence representation vector is semantically consistent with word representation vectors for the term and the definition in response to determining that the latent sequence label is equal to the latent term-definition label.

The series of acts 600 can also include training the machine-learning model by learning parameters of layers of the machine-learning model. For example, the series of acts 600 can include determining a dependency loss utilizing a dependency loss function based on a dependency probability distribution associated with the dependency path between the term and the definition among the word sequence. The series of acts 600 can include determining a classification loss utilizing a classification loss function based on a classification probability distribution associated with classifying the word sequence. The series of acts 600 can also include determining a labeling loss utilizing a labeling loss function based on a labeling probability distribution associated with generating the word labels for the words within the word sequence. The series of acts 600 can also include determining a semantic consistency loss utilizing a semantic consistency loss function by comparing predicted latent labels for the word sequence and a term-definition pair. Additionally, the series of acts 600 can include jointly learning parameters of a plurality of layers of the machine-learning model based on a joint loss function comprising the dependency loss function, the classification loss function, and the labeling loss function. The series of acts 600 can further include applying a first weight to the first loss function, a second weight to the second loss function, and a third weight to the third loss function in the joint loss function. The joint loss function can further include the semantic consistency loss function and a fourth weight applied to the semantic consistency loss function.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
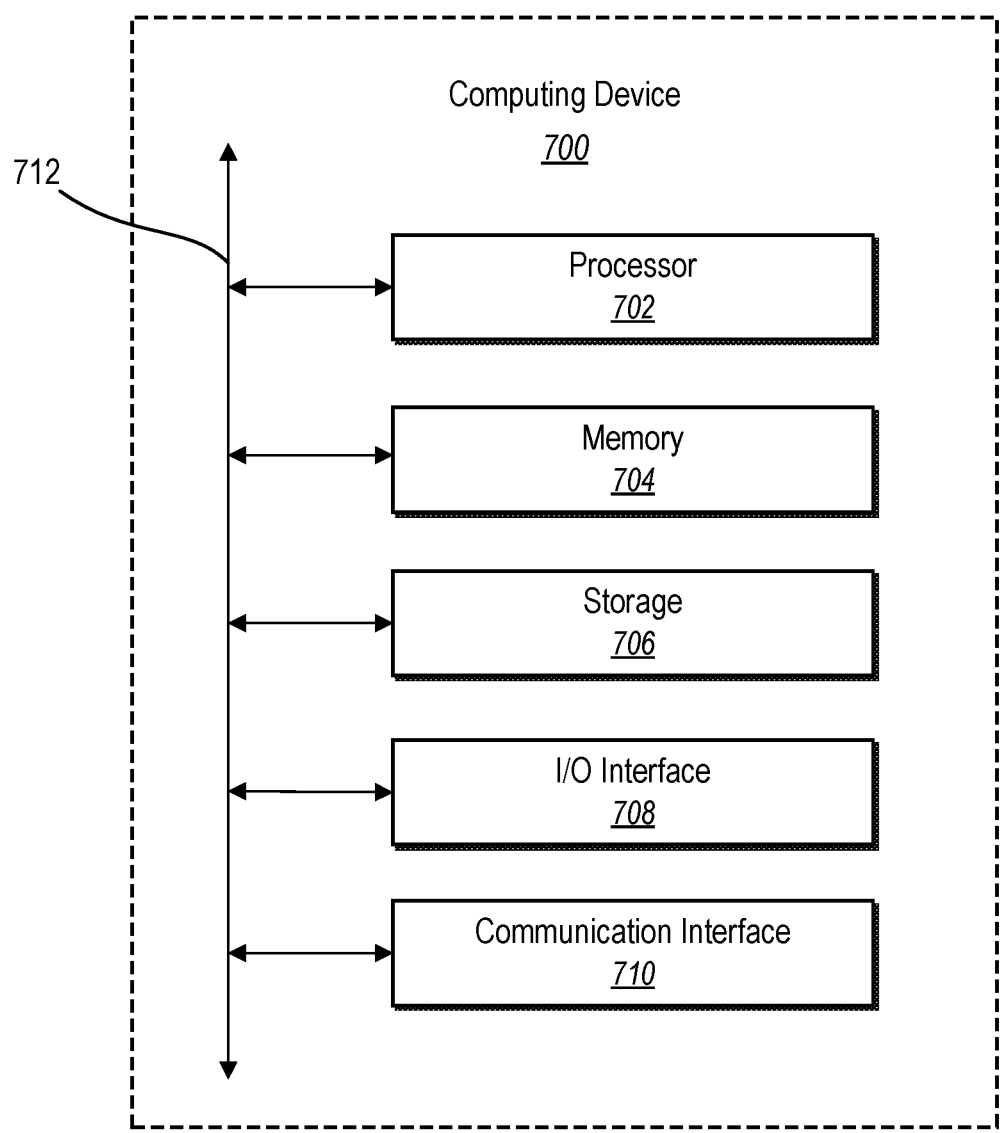
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system(s) of FIG. 1. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   receive a source document comprising a word sequence arranged in one or more sentences;
   generate, utilizing a first set of encoding layers of a machine-learning model, a first set of feature representations comprising contextual information for words in the word sequence based on neighboring words in the word sequence;
   generate, utilizing a second set of encoding layers of the machine-learning model and based on the first set of feature representations, a second set of feature representations comprising dependency information associated with the words in the word sequence;
   generate, utilizing sequence classification layers of the machine-learning model and from the second set of feature representations from the second set of encoding layers, a classification for the word sequence indicating that the word sequence comprises a definition for a term, the definition corresponding to one or more first words in the word sequence and the term corresponding to one or more second words in the word sequence;
   generate, utilizing sequence labeling layers of the machine-learning model and from the first set of feature representations from the first set of encoding layers and the second set of feature representations from the second set of encoding layers, labels for words within the word sequence corresponding to the term and the definition; and
   extract the definition for the term from the source document based on the classification of the word sequence from the sequence classification layers of the machine-learning model and the labels for the words within the word sequence from the sequence labeling layers of the machine-learning model.

2. The non-transitory computer readable storage medium as recited in claim 1, further comprising instructions that, when executed by the at least one processor, cause the computing device to:
   generate, via a first branch of the machine-learning model, the classification for the word sequence utilizing sequence classification layers receiving the first set of feature representations from the first set of encoding layers; and
   generate, via a second branch of the machine-learning model, the labels for the words within the word sequence utilizing sequence labeling layers receiving the first set of feature representations from the first set of encoding layers and the second set of feature representations from the second set of encoding layers.

3. The non-transitory computer readable storage medium as recited in claim 1, further comprising instructions that, when executed by the at least one processor, cause the computing device to extract the definition for the term from the source document by extracting at least a first portion of the definition from a first sentence within the word sequence and at least a second portion of the definition from a second sentence within the word sequence.

4. The non-transitory computer readable storage medium as recited in claim 1, further comprising instructions that, when executed by the at least one processor, cause the computing device to generate, utilizing the second set of encoding layers of the machine-learning model, the second set of feature representations comprising dependency-encoded-word vectors indicating a dependency path between the term and the definition within the word sequence utilizing a global dependency tree.

5. The non-transitory computer readable storage medium as recited in claim 4, further comprising instructions that, when executed by the at least one processor, cause the computing device to generate the second set of feature representations comprising the dependency-encoded-word vectors by:
   generating, utilizing the first set of encoding layers from the machine-learning model, a word representation vector for a particular word in the word sequence based on a word embedding and a parts-of-speech embedding vector associated with the particular word; and
   generating, utilizing the second set of encoding layers from the machine-learning model, a dependency-encoded-word vector for the particular word based on the word representation vector for the particular word and word representation vectors for neighboring words in the global dependency tree.

6. The non-transitory computer readable storage medium as recited in claim 5, further comprising instructions that, when executed by the at least one processor, cause the computing device to generate, utilizing the machine-learning model, the labels for the words within the word sequence by:
   determining, for the particular word in the word sequence, a feature vector by concatenating the word representation vector and the dependency-encoded-word vector of the particular word; and
   based on the feature vector, determining a label for the particular word indicating that the particular word is part of the term, the definition, a qualifier for the definition, or a non-definitional word.

7. The non-transitory computer readable storage medium as recited in claim 6, further comprising instructions that, when executed by the at least one processor, cause the computing device to determine the label for the particular word by:
   converting the feature vector into a score vector comprising a set of label scores corresponding to a set of possible labels for the particular word; and determining, utilizing a conditional random field model, the label for the particular word according to the score vector.

8. The non-transitory computer readable storage medium as recited in claim 4, further comprising instructions that, when executed by the at least one processor, cause the computing device to generate, utilizing the sequence classification layers of the machine-learning model, the classification for the word sequence indicating that the word sequence comprises the definition for the term by:
generating, utilizing a first set of sequence classification layers from the machine-learning model, a sequence representation vector for the word sequence by aggregating the dependency-encoded-word vectors for the words in the word sequence; and
determining, utilizing a second set of sequence classification layers from the machine-learning model, that the word sequence comprises the definition for the term based on the sequence representation vector.

9. The non-transitory computer readable storage medium as recited in claim 4, further comprising instructions that, when executed by the at least one processor, cause the computing device to generate the global dependency tree by:
parsing, utilizing natural language processing, a plurality of sentences of the word sequence to determine a plurality of dependency trees for the plurality of sentences; and
generating the global dependency tree by linking the plurality of dependency trees using a global root node.

10. A system comprising:
at least one computer memory device comprising a neural network and a source document comprising a word sequence arranged in a set of sentences; and
one or more servers configured to cause the system to:
generate, utilizing a first set of encoding layers of the neural network, a hidden vector sequence comprising contextual information for words in the word sequence based on neighboring words in the word sequence;
generate, utilizing a second set of encoding layers of the neural network and based on the hidden vector sequence, dependency-encoded-word vectors indicating a dependency path between a term and a definition within the word sequence utilizing a global dependency tree, the definition corresponding to one or more first words in the word sequence and the term corresponding to one or more second words in the word sequence;
generate, utilizing sequence classification layers of the neural network and from the dependency-encoded-word vectors from the second set of encoding layers, a classification for the word sequence indicating that the word sequence comprises the term and the definition for the term based on the dependency-encoded-word vectors;
generate, utilizing sequence labeling layers of the neural network and from the hidden vector sequence from the first set of encoding layers and the dependency-encoded-word vectors from the second set of encoding layers, labels for words from the word sequence corresponding to the term and the definition based on the dependency-encoded-word vectors; and
extract the definition for the term from the source document based on the classification of the word sequence from the sequence classification layers of the neural network and the labels for the word sequence from the sequence labeling layers of the neural network.

11. The system as recited in claim 10, wherein the one or more servers are further configured to:
generate, utilizing the sequence classification layers in a first branch of the neural network, the classification for the word sequence by receiving the dependency-encoded-word vectors from the second set of encoding layers; and
generate, utilizing the sequence labeling layers in a second branch of the neural network in parallel with the first branch, the labels for the words within the word sequence by receiving the hidden vector sequence from the first set of encoding layers and the dependency-encoded-word vectors from the second set of encoding layers.

12. The system as recited in claim 10, wherein the one or more servers are further configured to generate, utilizing the sequence classification layers of the neural network, the classification for the word sequence as comprising the definition for the term by:
generating, utilizing max pooling, a sequence representation vector for the word sequence by aggregating the dependency-encoded-word vectors for the words in the word sequence; and
determining, utilizing a feed forward network, that the word sequence comprises the definition for the term based on the sequence representation vector.

13. The system as recited in claim 10, wherein the one or more servers are further configured to:
generate the hidden vector sequence by generating, utilizing a bi-directional long-short-term-memory network of the first set of encoding layers from the neural network, a word representation vector for a particular word in the word sequence based on a word embedding and a parts-of-speech embedding vector associated with the particular word; and
generate the dependency-encoded-word vectors by generating, utilizing a graph convolutional network of the second set of encoding layers from the neural network, a dependency-encoded-word vector for the particular word based on the word representation vector for the particular word and word representation vectors for neighboring words in the global dependency tree.

14. The system as recited in claim 10, wherein the one or more servers are further configured to:
determine a lowest common ancestor of the term and the definition from the global dependency tree; and
determine a dependency path associated with the term and the definition according to the lowest common ancestor of the term and the definition.

15. The system as recited in claim 10, wherein the one or more servers are further configured to:
determine a latent sequence label based on a sequence representation vector for the word sequence;
determine a latent term-definition label based on word representation vectors for the term and the definition; and
determine that a sequence representation vector is semantically consistent with word representation vectors for the term and the definition in response to determining that the latent sequence label is equal to the latent term-definition label.

16. The system as recited in claim 10, wherein the one or more servers are further configured to:
generate a classification probability distribution associated with generating the classification for the word sequence indicating that the word sequence comprises the definition for the term;

determine a classification loss utilizing a classification loss function according to the classification probability distribution;

generate a labeling probability distribution associated with generating the labels for the words within the word sequence; and determine a labeling loss utilizing a labeling loss function based on the labeling probability distribution.

17. The system as recited in claim 16, wherein the one or more servers are further configured to:

generate a dependency probability distribution associated with the dependency path between the term and the definition within the word sequence;

determine a dependency loss utilizing a dependency loss function based on the dependency probability distribution; and jointly learn parameters of a plurality of layers of the neural network based on a joint loss comprising the dependency loss, the classification loss, and the labeling loss.

18. The system as recited in claim 17, wherein the one or more servers are further configured to determine the joint loss by applying a first weight to the dependency loss, a second weight to the classification loss, and a third weight to the labeling loss.

19. A method comprising:

receiving, by at least one processor, a source document comprising a word sequence arranged in one or more sentences;

generating, utilizing a first set of encoding layers of a machine-learning model, a first set of feature representations comprising contextual information for words in the word sequence based on neighboring words in the word sequence;

generating, utilizing a second set of encoding layers of the machine-learning model and based on the first set of feature representations, a second set of feature representations comprising dependency information associated with the words in the word sequence;

generating, utilizing sequence classification layers of the machine-learning model and from the second set of feature representations from the second set of encoding layers, a sequence classification for the word sequence indicating that the word sequence comprises a term and a definition for the term;

generating, utilizing sequence labeling layers of the machine-learning model and from the first set of feature representations from the first set of encoding layers and the second set of feature representations from the second set of encoding layers, labels for words within the word sequence corresponding to the term and the definition; and extracting, by the at least one processor, the definition for the term within the word sequence from the source document based on the sequence classification for the word sequence from the sequence classification layers of the machine-learning model and the labels for the words within the word sequence from the sequence labeling layers of the machine-learning model, the definition corresponding to one or more first words in the word sequence and the term corresponding to one or more second words in the word sequence.

20. The method as recited in claim 19, wherein extracting the definition for the term within the word sequence from the source document comprises extracting at least a first portion of the definition from a first sentence within the word sequence and at least a second portion of the definition from a second sentence within the word sequence.

* * * * *